(12) United States Patent
Wilson, III

(10) Patent No.: US 9,504,292 B2
(45) Date of Patent: Nov. 29, 2016

(54) METHOD OF BONDING PEBA PLASTIC COMPOSITION

(71) Applicant: NIKE, Inc., Beaverton, OR (US)

(72) Inventor: Thomas W. Wilson, III, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 701 days.

(21) Appl. No.: 13/855,360

(22) Filed: Apr. 2, 2013

(65) Prior Publication Data

US 2014/0290096 A1    Oct. 2, 2014

(51) Int. Cl.
| | | |
|---|---|---|
| *B32B 27/34* | (2006.01) | |
| *A43B 9/12* | (2006.01) | |
| *A43B 13/04* | (2006.01) | |
| *A43B 13/14* | (2006.01) | |
| *A43B 13/16* | (2006.01) | |
| *B29D 35/12* | (2010.01) | |
| *C09J 5/02* | (2006.01) | |
| *C08G 69/40* | (2006.01) | |
| *C08L 77/00* | (2006.01) | |
| *C09J 175/04* | (2006.01) | |
| *B32B 37/12* | (2006.01) | |

(52) U.S. Cl.
CPC .................. *A43B 9/12* (2013.01); *A43B 13/04* (2013.01); *A43B 13/141* (2013.01); *A43B 13/16* (2013.01); *B29D 35/122* (2013.01); *B32B 27/34* (2013.01); *C08G 69/40* (2013.01); *C08L 77/00* (2013.01); *C09J 5/02* (2013.01); *C09J 175/04* (2013.01); *B32B 2037/1276* (2013.01); *Y10T 428/3175* (2015.04); *Y10T 428/31725* (2015.04)

(58) Field of Classification Search
CPC .. B32B 7/12; B32B 27/34; B32B 2037/1276
USPC .......................... 156/308.8, 316, 331.7, 281
See application file for complete search history.

(56) References Cited

U.S. PATENT DOCUMENTS

| | | | |
|---|---|---|---|
| 4,663,082 A * | 5/1987 | Bobsein ................. | C11D 1/755 |
| | | | 510/254 |
| 4,717,618 A | 1/1988 | Tse et al. | |
| 4,898,591 A | 2/1990 | Jang et al. | |
| 5,369,179 A | 11/1994 | Havens | |
| 5,506,310 A | 4/1996 | Vasselin et al. | |
| 5,709,954 A | 1/1998 | Lyden et al. | |
| 5,786,057 A | 7/1998 | Lyden et al. | |
| 5,843,268 A | 12/1998 | Lyden et al. | |

(Continued)

FOREIGN PATENT DOCUMENTS

| | | |
|---|---|---|
| EP | 0144239 | 6/1985 |
| EP | 0313861 | 5/1989 |

(Continued)

OTHER PUBLICATIONS

International Preliminary Report on Patentability, issued Oct. 6, 2015 in PCT Application No. PCT/US2014/032349.

(Continued)

*Primary Examiner* — Scott W Dodds
(74) *Attorney, Agent, or Firm* — Shook, Hardy & Bacon L.L.P.

(57) ABSTRACT

A method for bonding PEBA plastic composition with dissimilar materials. Also, composite articles made in accordance with the method. The method uses only water-borne adhesive compositions.

13 Claims, 23 Drawing Sheets

(56) References Cited

U.S. PATENT DOCUMENTS

| | | |
|---|---|---|
| 5,906,872 A | 5/1999 | Lyden et al. |
| 5,962,146 A | 10/1999 | Betremieux et al. |
| 5,998,545 A | 12/1999 | Melot et al. |
| 6,217,961 B1 | 4/2001 | Hert et al. |
| 6,303,069 B1 | 10/2001 | Anhalt et al. |
| 6,361,730 B1 | 3/2002 | Alex et al. |
| 7,097,908 B2 | 8/2006 | Lacroix et al. |
| 7,365,116 B2 | 4/2008 | Chen |
| 7,897,685 B2 | 3/2011 | Chou et al. |
| 2003/0088003 A1 | 5/2003 | Corzani et al. |
| 2003/0088221 A1 | 5/2003 | Corzani et al. |
| 2003/0113548 A1 | 6/2003 | Corzani et al. |
| 2005/0084685 A1 | 4/2005 | Lacroix et al. |
| 2006/0201028 A1 | 9/2006 | Chan et al. |
| 2007/0149690 A1 | 6/2007 | Zoromski et al. |
| 2007/0172670 A1 | 7/2007 | Mutsuda et al. |
| 2008/0032055 A1 | 2/2008 | Ogawa et al. |
| 2008/0276497 A1 | 11/2008 | Chou et al. |
| 2008/0318037 A1 | 12/2008 | Maral et al. |
| 2009/0208758 A1 | 8/2009 | D'Herbecourt et al. |
| 2010/0003486 A1 | 1/2010 | Lalgudi et al. |
| 2010/0009584 A1 | 1/2010 | D'Herbecourt et al. |
| 2010/0143651 A1 | 6/2010 | Silvis et al. |
| 2010/0266854 A1 | 10/2010 | Kraus et al. |
| 2010/0292403 A1 | 11/2010 | Ansems et al. |

FOREIGN PATENT DOCUMENTS

| | | |
|---|---|---|
| EP | 0461453 | 12/1991 |
| EP | 0476895 | 3/1992 |
| EP | 1164161 | 12/2001 |
| FR | 2903417 | 1/2008 |
| JP | 5137144 | 3/1976 |
| WO | 9001345 | 2/1990 |
| WO | 9413164 | 6/1994 |
| WO | 0197870 | 12/2001 |
| WO | 0214417 | 2/2002 |
| WO | 02066218 | 8/2002 |
| WO | 2005109994 | 11/2005 |
| WO | 2006063224 | 6/2006 |
| WO | 2006098715 | 9/2006 |

OTHER PUBLICATIONS

International Search Report and the Written Opinion of the International Searching Authority, mailed Sep. 4, 2014 in PCT Application No. PCT/US2014/032349.

* cited by examiner

METHOD OF BONDING PEBA PLASTIC COMPOSITION

BACKGROUND

The present disclosure relates generally to bonding of dissimilar compositions. In particular, the disclosure relates to an improved method of bonding polyether block amide (PEBA) plastic composition with dissimilar compositions. The disclosure also relates to composite articles made by the method.

Consumers expect high performance from consumer goods. For example, articles of footwear have changed from fabric foot wraps and simple footwear, such as sandals and moccasins, to complex and sophisticated footwear designed for use in a particular sport or activity. This evolution is based in part on the availability of materials of construction, particularly synthetic materials not otherwise available in nature. Similarly, almost every other class of goods has evolved as materials of construction became more sophisticated.

Materials of construction are selected for their contribution to the article of manufacture. In addition to natural materials, such as wood, leather, and metal, many man-made compositions have become available. In particular, a man-made material has been developed as a substitute for almost every natural material. Some man-made materials essentially replaced the natural material (for example, polyamide essentially replaced silk in women's stockings) while other man-made materials are less successful replacements (such as poromeric materials as a leather substitute).

Polymeric materials such as plastics are widely available. Plastic materials may be thermoset or thermoplastic, elastic or plastic, and rigid or flexible, for example. The properties and characteristics of plastic materials are as varied as are the compositions. The varied properties of plastic materials may make combinations of materials especially useful.

For example, relatively elastic and relatively inelastic materials have been used in the construction of articles of footwear for many years. In particular, rubber materials have been widely used in the fabrication of midsoles and outsoles of articles of footwear. Rubber and plastic elements frequently are placed in direct communication with one another in the fabrication of an article of footwear with conventional fixation methods including stitching, riveting, screwing, nailing, and the use of various adhesives.

These methods of fixation achieve the object of combination with varied degrees of success. For example, use of adhesives requires careful selection. Adhesives typically are selected to be compatible with each of the substrates to be attached lest the substrates be damaged by the adhesive. For example, adhesives comprising solvents may mar the surface of the substrates. Similarly, other conventional fixation methods may cause weak areas in the materials in the area of the piercing required to stitch, nail, or rivet items, for example.

Direct injection of plastic onto rubber, leather, and many of the natural and synthetic textiles also is known, particularly in footwear manufacture. Direct injection may form a mechanical bond prone to delamination of plastic from the other material as the result of bond failure induced by fatigue and environmental degradation.

Chemical (covalent) bonding and co-vulcanization may be effective between specific rubber and plastic articles. Also, vulcanization is known in the art as a means of attaching shoe portions to each other. However, the dissimilar properties of rubbers and thermoplastics and thermoplastic elastomers result from different chemical properties and characteristics, thus making vulcanization of one to the other without pretreatment of one or both substrates problematic to achieve.

In footwear, performance properties and characteristics relating to parts of the footwear are important. For example, in some specific utilities, the shoe sole should be flexible and resistant to wear. In such cases, rubber ground-engaging segments may be placed on the bottom of an outsole, or flexible rubber inserts may be used between more rigid sole segments. However, these combinations have been limited to a few combinations of materials that both have the properties and characteristics necessary to provide the properties and characteristics expected and may be durably bonded together.

Footwear outsoles comprised entirely of rigid plastic materials may be inappropriate for some articles of footwear, i.e., athletic footwear such as shoes for running, basketball, tennis, racquetball, etc. The rigidity, weight, and lack of traction of such materials may render outsoles comprised entirely of rigid plastic materials less suitable for use in some athletic footwear. Although rubber may be a more appropriate choice for an outsole of footwear for activities that require good traction, outsoles comprised entirely of rubber materials for articles of footwear may lack necessary support for some uses.

Thus, there exists a need for an article of footwear that comprises an outsole having different materials having selected physical and mechanical properties in different regions, and wherein these materials are adequately bonded to one another. There exists a need to provide a flexible, light, and durable articles, particularly soles for use in an article of footwear. Additionally, there is a need to provide an efficient, economical, and low-emission method for bonding relatively elastic and relatively inelastic materials.

SUMMARY

In one aspect, the disclosure provides a method for bonding a first substrate comprising a blend of PEBA and styrene/maleic anhydride copolymer (SMA) having a prepared surface to a second substrate comprising dissimilar material. The method comprises applying an aqueous primer to the prepared surface on the first substrate to form a primed surface on the first substrate; applying a water-borne adhesive to the primed surface on the first substrate to form an adhesive-coated surface on the first substrate; applying an aqueous primer to a prepared surface on the second substrate to form a primed surface on the second substrate; applying a water-borne adhesive to the primed surface on the second substrate to form an adhesive-coated surface on the second substrate; and contacting the adhesive-coated surface on the first substrate with the adhesive-coated surface on the second substrate to bond the substrates.

In another aspect, the disclosure provides a composite article comprising a first substrate comprising a blend of PEBA and SMA bonded to a second substrate using only water-borne compositions.

In still another aspect, the disclosure provides an article comprising a composite article comprising a first substrate comprising a blend of PEBA and SMA bonded to a second substrate using only water-borne compositions.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
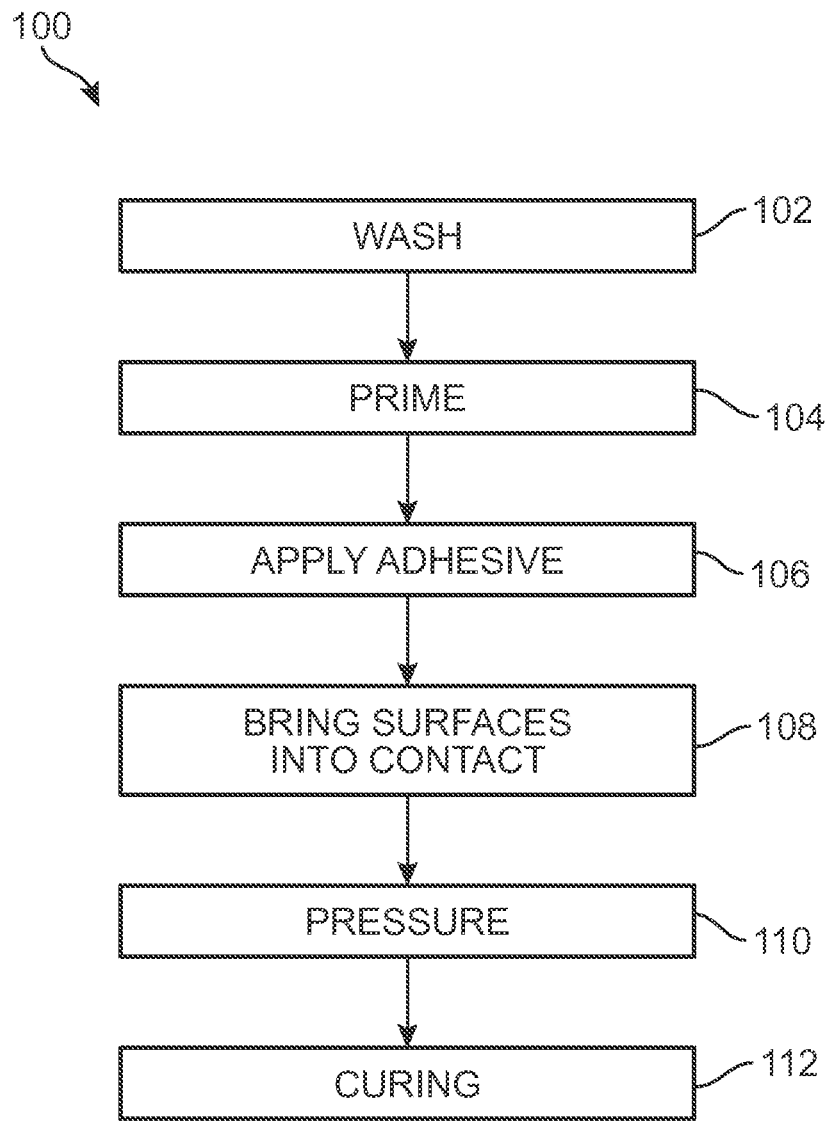
FIG. 1 is a schematic diagram of a preferred embodiment of a method disclosed herein.

In one aspect, the disclosure provides a method for bonding a first substrate comprising a blend of PEBA and SMA having a prepared surface to a second substrate comprising dissimilar material. The method comprises applying an aqueous primer to the prepared surface on the first substrate to form a primed surface on the first substrate; applying a water-borne adhesive to the primed surface on the first substrate to form an adhesive-coated surface on the first substrate; applying an aqueous primer to a prepared surface on the second substrate to form a primed surface on the second substrate; applying a water-borne adhesive to the primed surface on the second substrate to form an adhesive-coated surface on the second substrate; and contacting the adhesive-coated surface on the first substrate with the adhesive-coated surface on the second substrate to bond the substrates.

In another aspect, the disclosure provides a composite article comprising a first substrate comprising a blend of PEBA and SMA bonded to a second substrate comprising dissimilar material using only water-borne compositions.

In still another aspect, the disclosure provides an article, such as an article of footwear or a luggage tag, that includes a composite article comprising a first substrate comprising a blend of PEBA and SMA bonded to a second substrate comprising dissimilar material using only water-borne compositions.

In embodiments of the disclosure, dissimilar materials may be bonded using only aqueous compositions. Known adhesive methods of bonding dissimilar materials typically require use of organic solvent-based compositions such as cleaning fluids to prepare the bonding surfaces of the substrates. Known adhesive methods also typically require organic solvent-based primers and adhesives to obtain a secure bond between the materials.

In embodiments of the disclosure, a first substrate comprising PEBA and styrene/maleic anhydride may be bonded with dissimilar materials using only water-borne compositions such as surface preparations and adhesives. Material dissimilar to PEBA may be selected from a wide variety of materials. Dissimilar materials may be selected from materials such as leather, rubber materials, foams, and plastic material. For the purposes of this disclosure, the dissimilar material includes PEBA. Thus, the same or different types of PEBA may be bonded to each other in embodiments of the disclosure.

For convenience, the disclosure as it relates to particular dissimilar materials will be described in detail as it relates to elastomeric rubber material. Rubber material may be a natural rubber or may be a synthetic rubber. Typically, natural elastomeric rubber comprises isoprene, typically cis-1,4-polyisoprene. Gutta-percha, trans-1,4-polyisoprene, is not elastic. Synthetic rubbers typically may be copolymers of styrene and 1,3-butadiene (SBR), polyisoprene, chloroprene, or isobutylene. Isoprene also may be included in these rubbers to enable cross-linking. Synthetic rubber also may be made from pure isoprene. For convenience, as described in detail herein, the first substrate is a blend of PEBA and SMA; the second substrate is rubber material. However, other materials may be a material dissimilar from PEBA.

Various forms of PEBA, styrene/maleic anhydride copolymer, and rubber material can be made and are commercially available. These various forms include, for example, different polyamide and ether compounds in the chain, or different ratios of polyether to polyamide, in PEBA. Similarly, various ratios of styrene and maleic anhydride are available in styrene/maleic anhydride copolymers, and rubber material may be based on various monomers. In block polymers such as PEBA and copolymers such as styrene/maleic anhydride, different end caps or terminal groups may be used. Molecular weights of these polymers and of rubber material typically can vary. In embodiments of the disclosure, any of the various forms of these compounds that are compatible with the other components may be used. PEBA is a solid product at room temperature.

PEBA is the product of copolycondensation of polyamide sequences comprising reactive ends with polyether sequences comprising reactive ends. For example, a PEBA may be made by copolycondensation of polyamide having diamine chain ends with polyoxyalkylene having dicarboxyl chain ends. Another PEBA may be made by copolycondensation of polyamide having dicarboxyl chain ends with polyoxyalkylene having diamine chain ends. PEBA in the form of polyetheresteramides may be obtained by copolycondensation of polyamide having dicarboxyl chain ends with polyether diols.

The length of the polyamide blocks and of the polyether blocks may be established by forming the polyamide and polyether separately. It also is possible to react polyether and precursors of the polyamide blocks simultaneously to form a random arrangement. For example, polyether diol, polyamide precursors, and a chain-limiting diacid can be reacted to obtain a polymer having essentially polyether blocks and polyamide blocks of highly variable length, but also the various reactants which have reacted randomly and which are distributed randomly along the PEBA polymer chain. Similarly, reaction of polyether diamine, polyamide precursors, and a chain-limiting diacid yields a PEBA polymer having polyether blocks and polyamide blocks of various lengths together with various reactants distributed randomly along the PEBA polymer chain.

In one method of making polyamide blocks, dicarboxylic acids are reacted with aliphatic or aromatic diamine to form polyamide blocks. The dicarboxylic acids typically have from 4 to about 20 carbon atoms, and the diamines typically have from 2 to about 20 carbon atoms. In another method of making PEBA, polyamide blocks are made by reacting α,ω-aminocarboxylic acid having dicarboxyl chain ends, lactams having between about 6 and about 12 carbon atoms, or blends thereof, with polyoxyalkylene having diamine chain ends. Other methods of making polyamide blocks are known to the skilled practitioner. With the guidance provided herein, the skilled practitioner will be able to select or manufacture a suitable PEBA polymer.

Another PEBA may be made by copolycondensation of polyamide having dicarboxyl chain ends with polyoxyalkylene having diamine chain ends. PEBA in the form of polyetheresteramides may be obtained by copolycondensation of polyamide having dicarboxyl chain ends with polyether diols.

PEBA polymer is available commercially from Arkema under the trade name Pebax®. Many grades are available, with different combinations of polyamide block composition and length, polyether block composition and length, minor additives, and the like. Exemplary products include low density grades such as Pebax® 7233, Pebax® 7033, and Pebax® 6333. These PEBA polymers comprise polyamide 12 polyamide blocks and polyether blocks. In some embodiments of the disclosure, Pebax® 7033 may be used. With the guidance provided herein, the user will be able to select a PEBA suitable for an intended use.

Styrene/maleic anhydride copolymer is a combination of styrene and maleic anhydride that is commercially available in many versions. As used herein, styrene/maleic anhydride copolymer includes styrene/maleic anhydride esters, i.e., styrene/maleic anhydride copolymer wherein the maleic anhydride group is partially esterified with an alcohol. Styrene/maleic anhydride copolymers are solids at room temperature and typically are available in powder form or flake form.

The ratio of styrene to maleic anhydride in styrene/maleic anhydride copolymer may vary, as may the length of styrene and maleic anhydride chains and the molecular weight of the copolymer. A structural formula for a typical styrene/maleic anhydride copolymer is as follows:

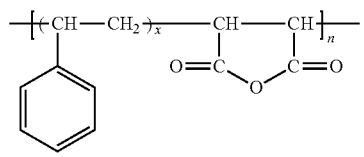

wherein x is 1-4, 6, or 8 and n is between about 8 and about 12. Other styrene/maleic anhydride copolymers with different ratios and molecular weights also may be made.

As can be seen from the structural formula, the average styrene/maleic anhydride molar ratio typically is 1/1, 2/1, 3/1, 4/1, 6/1, or 8/1. These ratios reflect the average ratio for the styrene/maleic anhydride copolymer because, as is typical with such polymers, some molecules likely will have a higher than average ratio and some molecules likely will have a lower than average ratio.

Styrene/maleic anhydride copolymer may be made by polymerizing styrene and maleic anhydride monomers present at the start of reaction in approximately a target styrene/maleic anhydride ratio. The monomers then can randomly react with other molecules, such as other monomers, oligomers, and polymer chains, in the mixture. In an alternative method, styrene oligomers can be prepared separately and then reacted with maleic anhydride to form the styrene/maleic anhydride copolymer.

Styrene/maleic anhydride partial esters are made by reacting styrene/maleic anhydride copolymer with at least 1 alcohol. These partial esters differ by the composition of the styrene/maleic anhydride copolymer used to make them, the structure of the alcohol used to esterify the styrene/maleic anhydride copolymer, and the degree of esterification. Typically, a styrene/maleic anhydride partial ester partially esterified with an alcohol having the structure R—OH has the following structural formula:

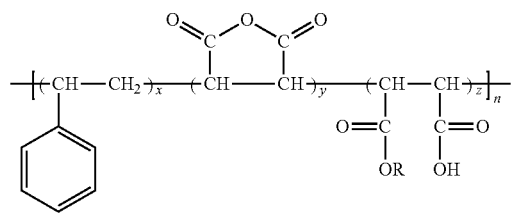

wherein x is 1 to 4, y is between about 0.20 and about 0.35, z is between about 0.65 and about 0.85, and n is between about 8 and about 12.

Styrene/maleic anhydride copolymer is available under the trade name SMA® from Cray Valley/Total. A number of grades are available. In particular, SMA® 1000 is an unmodified styrene/maleic anhydride copolymer having a styrene/maleic anhydride ratio of 1/1. Similarly, SMA® 2000 and SMA® 3000 have styrene/maleic anhydride ratios of 2/1 and 3/1, respectively. High purity forms of unmodified styrene/maleic anhydride copolymer also are available at styrene/maleic anhydride ratios of 3/1, 4/1, 6/1, and 8/1. Styrene/maleic anhydride partial esters are available as SMA® 17352, SMA® 1440, SMA® 2625, and SMA® 3840.

These styrene/maleic anhydride copolymers may have different end-caps and the styrene/maleic anhydride esters may be esterified with different alcohols. For example, SMA® 3840 is esterified with about 4 wt percent of a $C_8$-rich blend of $C_7$, $C_8$, and $C_9$ isoalcohols and is end-capped with cumene. With the guidance provided herein, the user will be able to select a styrene/maleic anhydride copolymer suitable for an intended use.

A blend of PEBA and styrene/maleic anhydride copolymer may be made by mixing the compounds in any suitable manner that forms an intimate mixture. In particular, the compounds, both of which are solids at ambient temperature, may be dry-mixed to form an intimate mixture.

A minor amount of styrene/maleic anhydride copolymer may be blended with a major quantity of PEBA composition. The concentration of styrene/maleic anhydride copolymer in a blend of PEBA and styrene/maleic anhydride copolymer typically is less than about 10 wt percent of the total of styrene/maleic anhydride copolymer and PEBA blended composition. More typically, the concentration of styrene/maleic anhydride copolymer in the blend is less than about 5 wt percent, more typically between about 0.5 wt percent and about 4 wt percent, and even more typically between about 1 wt percent and about 3 wt percent.

The presence of styrene/maleic anhydride copolymer in PEBA may have an effect on the melt flow index (MFI) of the blended composition. The MFI of the blended composition may decrease and go through a minimum as the concentration of styrene/maleic anhydride copolymer is increased. However, after the MFI minimum is experienced, the MFI may again increase. The styrene/maleic anhydride polymer concentration in the blend at which a MFI minimum is achieved may be related to the chemical compositions of both the PEBA compound and the styrene/maleic anhydride copolymer. However, changes in the MFI may affect processing to make an article comprising the blend of PEBA and styrene/maleic anhydride copolymer, but do not affect bonding of a substrate comprising the blend of PEBA and styrene/maleic anhydride copolymer.

Articles comprising a blend of PEBA and styrene/maleic anhydride copolymer may be made in any suitable manner. For example, the blend of PEBA and styrene/maleic anhydride copolymer may be melted to form a liquid and then formed to produce the article. For example, an article may be formed by blow molding, injection molding, or casting. In particular, injection molding often is used to form a PEBA article and is suitably used to produce an article comprising a blend of PEBA and styrene/maleic anhydride.

Embodiments of the disclosure enable bonding of a substrate or an article that is a blend of PEBA and styrene/maleic anhydride copolymer to a dissimilar material using only aqueous compositions. In embodiments of the disclosure, substrate surfaces to be bonded may be cleaned. Substrate surfaces to be bonded also may advantageously be primed before application of adhesive. In some embodiments of the disclosure, substrate surfaces may be both cleaned and primed before application of adhesive. Surfaces to be bonded may have adhesive applied thereto by any suitable method. Embodiments of the disclosure also may dry the primer before application of adhesive. In some embodiments of the disclosure, adhesive is dried and activated before placing the surfaces to be bonded in contact. Adhesive may be applied to one or both surfaces to be bonded. A method that is an embodiment of the disclosure is illustrated in FIG. 1.

FIG. 1 schematically illustrates method 100 that is an embodiment of the disclosure. Articles or substrates may be prepared to receive adhesive and typically are primed. The surface of a substrate comprising a blend of PEBA and styrene/maleic anhydride copolymer may be prepared for bonding. The preparation may include washing or cleaning, as illustrated at 102. Also, the surface of a rubber material substrate to be bonded may be washed or cleaned at 102. This washing of a rubber material substrate may be characterized as degreasing. The prepared surface and the degreased surface to be bonded of the substrates then may be primed at 104. Then, adhesive may be applied to the surfaces to be bonded of the substrates at 106. The surfaces then are brought into contact with each other at 108. The surfaces may be pressed at 110 and then dried and cured at 112, or may be moved directly from contact 108 to drying and curing at 112. After priming, the surfaces to be bonded with primer thereon may be dried at 104. Similarly, after application of adhesive, the surfaces to be bonded may be dried and the adhesive activated at 106.

In accordance with the method, therefore, water-borne cleaning fluids, primers, and adhesives may be used to effectively bond a blend of PEBA and styrene/maleic anhydride copolymer to a dissimilar material. Water-borne compositions may release water rather than solvents into the environment. Also, equipment used with water-borne compositions can be cleaned easily and efficiently with water. Water-borne compositions may contain minor amounts, typically less than about 15 percent, of solvent or volatile organic compounds. For example, a dispersion solution may be a dispersion of a composition in an organic solvent dissolved in water. Thus, methods that are embodiments of the disclosure substitute water for expensive organic solvents and volatile organic compounds.

In embodiments of the disclosure, surfaces of the substrates to be bonded may be prepared. Typically, bond strength may be adversely affected by contaminants on the surfaces to be bonded. For example, a substrate may have been cast, molded, blown, vulcanized, cross-linked, or otherwise processed under circumstances that may leave a residue of, for example, mold release agent or lubricant, on the surface of the substrate. Similarly, a substrate may have been die-cut, sliced, or otherwise partitioned in a manner that may leave a residue of lubricant or of particles of material on the substrate. Further, all substrates may be dusty, dirty, or otherwise contaminated during handling.

In embodiments of the disclosure, surfaces may be prepared for bonding by washing or cleaning with a water-borne cleaning solution at 102. Washing or cleaning removes the residues that may interfere with bonding by reducing bond strength. When applied to a rubber material substrate, this washing step may be called a degreasing step.

Figure 2:
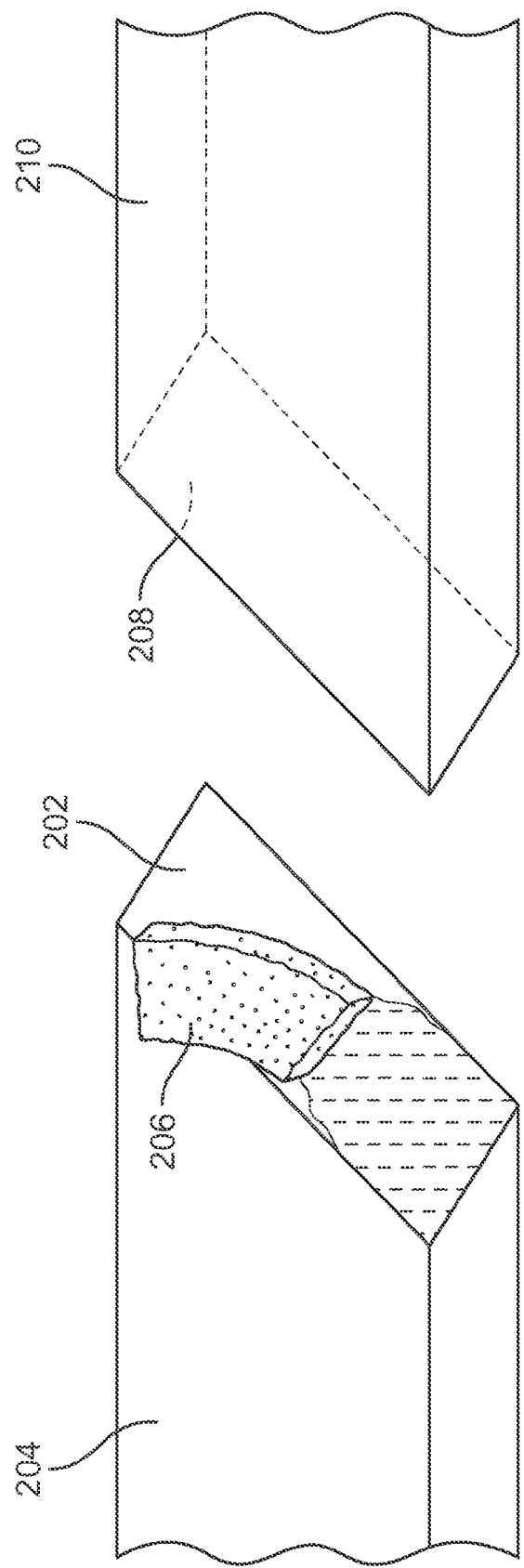
FIG. 2 is a schematic illustration of a washing or cleaning step of an embodiment of a method of the disclosure.

Washing or cleaning may be carried out in any suitable manner. FIG. 2 illustrates washing of surface 202 of PEBA substrate 204 with a wiper, such as sponge 206, carrying cleaning fluid. In embodiments of the disclosure, a wiper may be a sponge or another type of wiper, such as a cloth that may carry cleaning fluid. In some embodiments of the disclosure, cleaning fluid can be applied separately from the wiper, such as by dipping surface 202 into cleaning fluid. This washing may activate the surface of the blend of PEBA. Surface 208 of rubber material substrate 210 may be washed in the same way.

Figure 3:
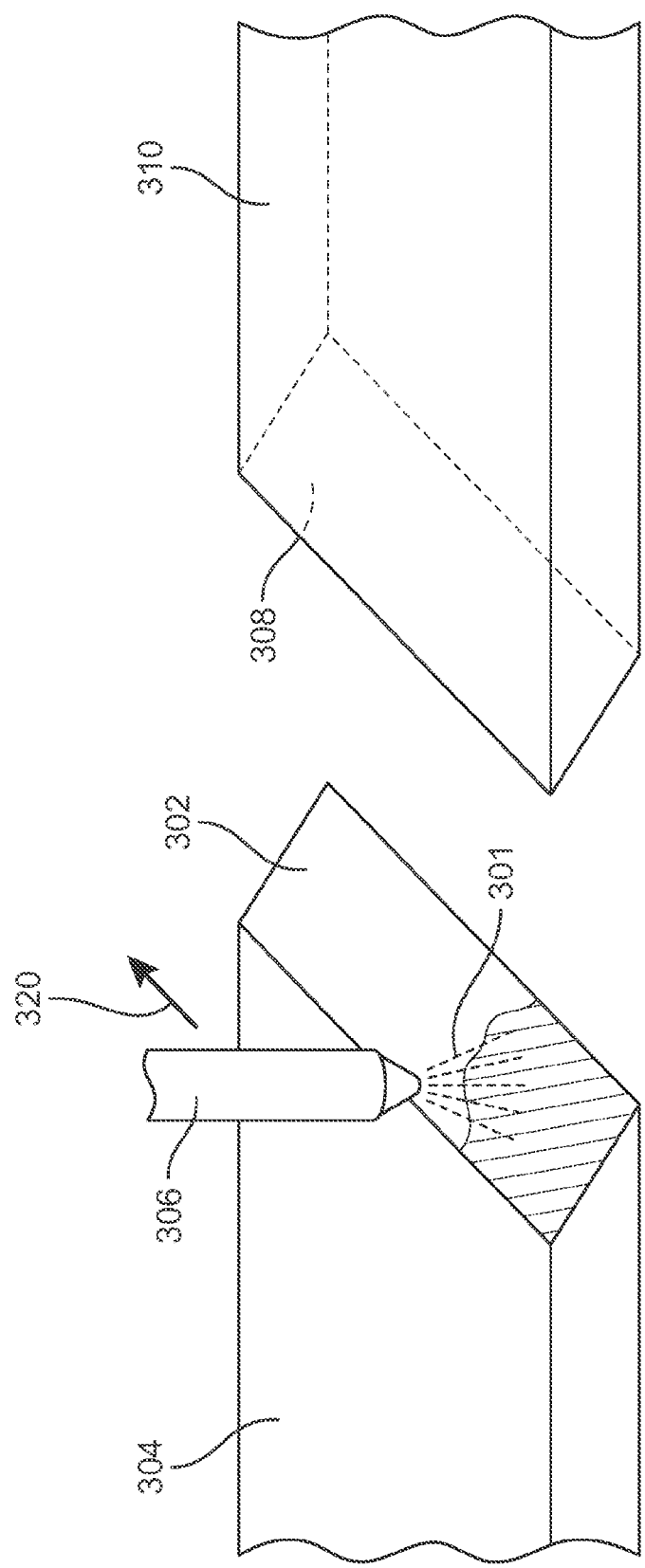
FIG. 3 is a schematic illustration of another embodiment of a washing or cleaning step of an embodiment of a method of the disclosure.

In embodiments of the disclosure, washing also may be carried out as illustrated in FIG. 3. As shown in FIG. 3, surface 302 of PEBA substrate 304 need not be wiped with another object, such as sponge 206. Rather, nozzle 306 may be used to spray cleaning fluid onto surface 302 in embodiments of the disclosure. For example, nozzle 306 may provide wash fluid at high flow rate or at high pressure. Cleaning fluid 301 may be delivered to surface 302 at a pressure or in a volume sufficient to ensure that loose particles are dislodged and removed from surface 302 together with any other contamination. Nozzle 306 may be moved across the surface of surface 302, for example, as indicated by arrow 320, to ensure that the entire surface is washed. Surface 308 of rubber material substrate 310 may be washed in the same way.

Figure 4:
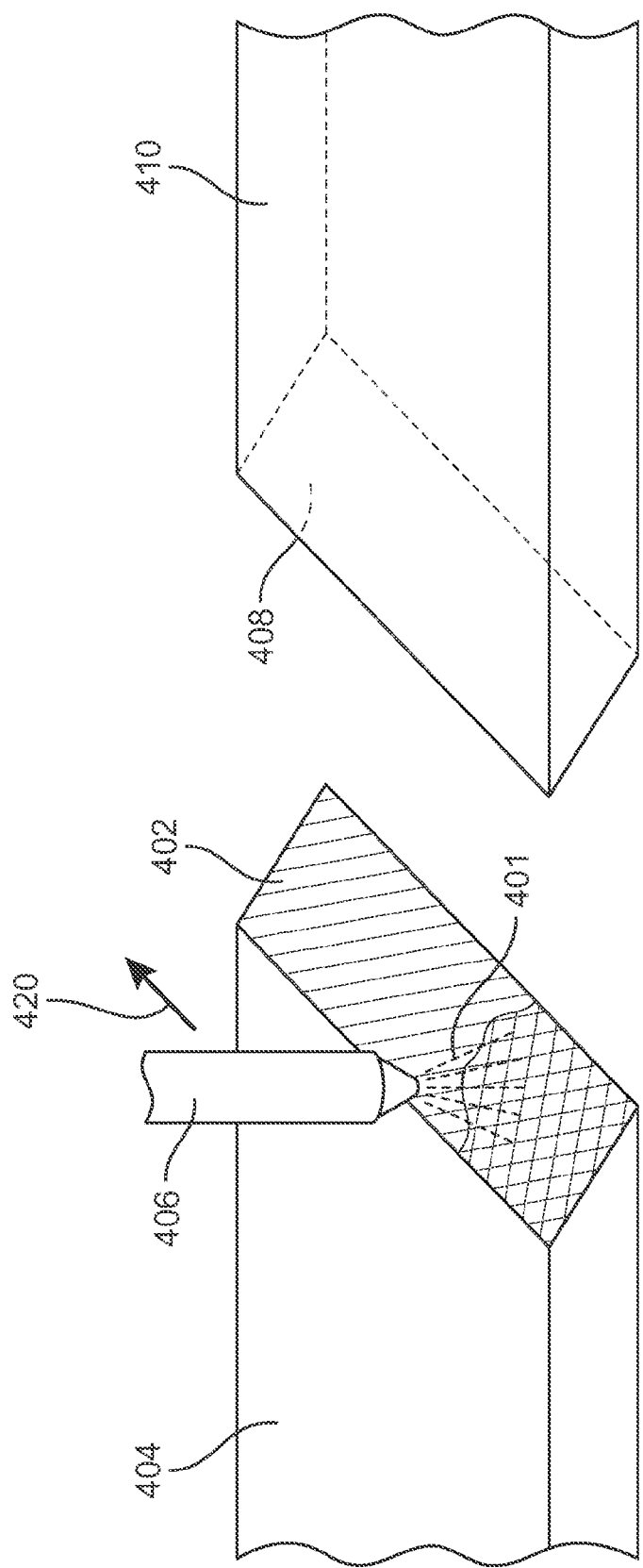
FIG. 4 is a schematic illustration of an application of primer step to washed or prepared substrate of an embodiment of a method of the disclosure.

In embodiments of the disclosure, prepared surfaces and washed surfaces then may be primed before adhesive or bonding agent is applied. FIG. 4 illustrates application of primer 401 to prepared surface 402 of PEBA substrate 404 in embodiments of the disclosure. Primer typically may be applied by spraying primer through pipe or tube 406 onto prepared surface 402. Primer may be applied to the entirety of prepared surface 402 by moving nozzle 406, for example, in the direction of arrow 420, to ensure that the entirety of surface 402 to be bonded is primed. Washed or degreased rubber material surface 408 of substrate 410 may be primed in the same way.

Figure 5:
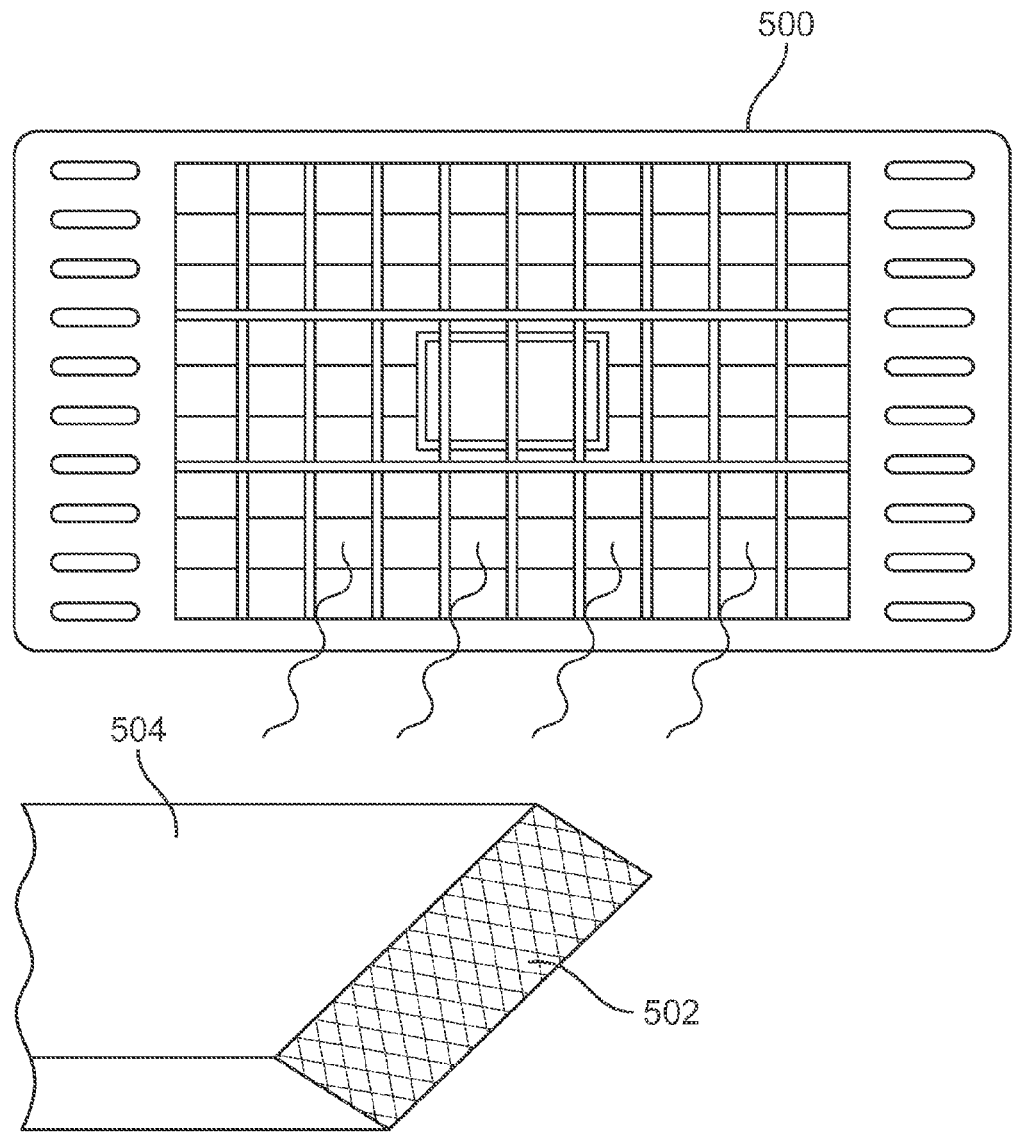
FIG. 5 is a schematic illustration of a heating step of an embodiment of a method of the disclosure.
Figure 6:
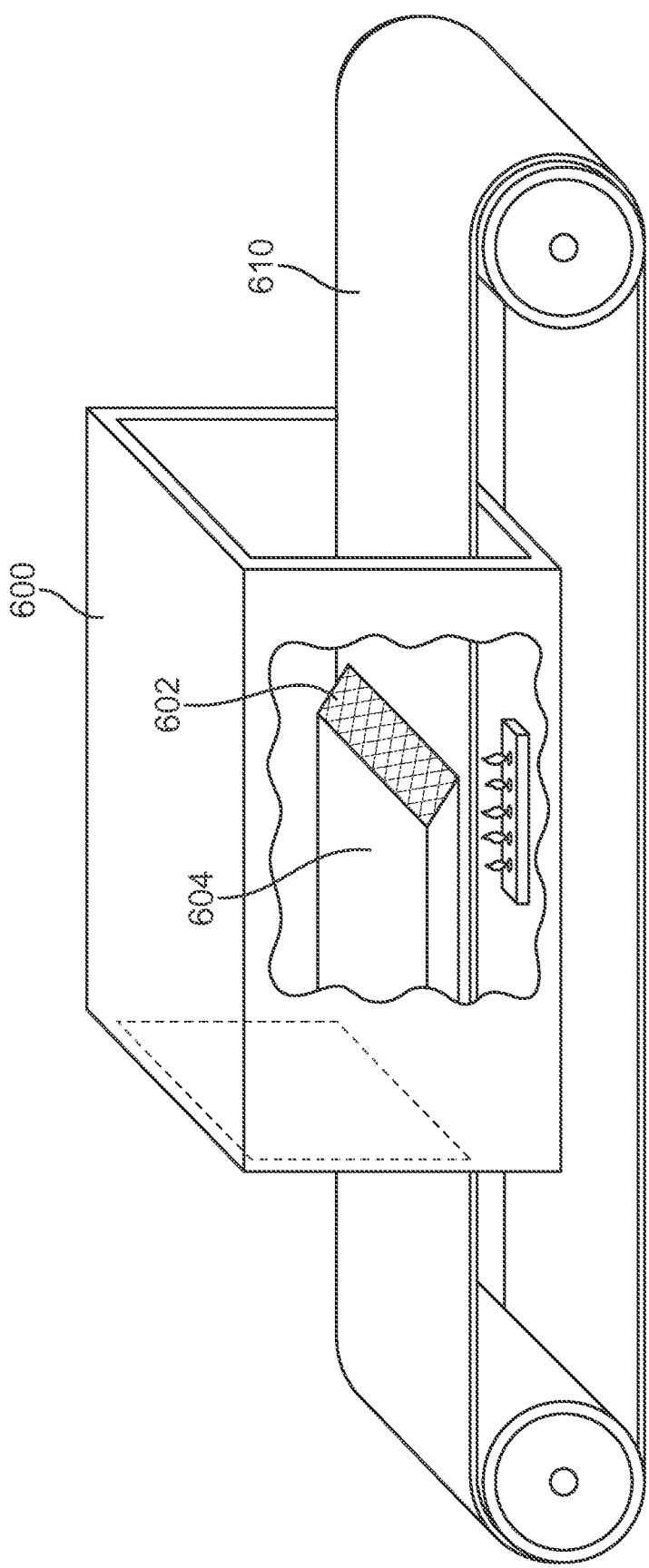
FIG. 6 is a schematic illustration of another embodiment of a heating step of an embodiment of a method of the disclosure.

In embodiments of the disclosure, primer may be dried before adhesive is applied. FIG. 5 and FIG. 6 illustrate this drying step of the method of embodiments of the disclosure. In embodiments of the disclosure, a primed surface of a substrate may be heated for a time and at a temperature sufficient to dry the surface. The primed surface may be dried in any suitable manner. FIG. 5 illustrates heater 500 imparting heat to surface 502 of substrate 504. Heater 500 may blow heated gas across surface 502 in embodiments of the disclosure. Heater 500 may irradiate surface 502 of substrate 504 with infrared irradiation in embodiments of the disclosure. FIG. 6 illustrates heating primed surface 602 of substrate 604 in oven 600. Substrate 604 may be carried through oven 600 on continuous belt 610, for example.

Figure 7:
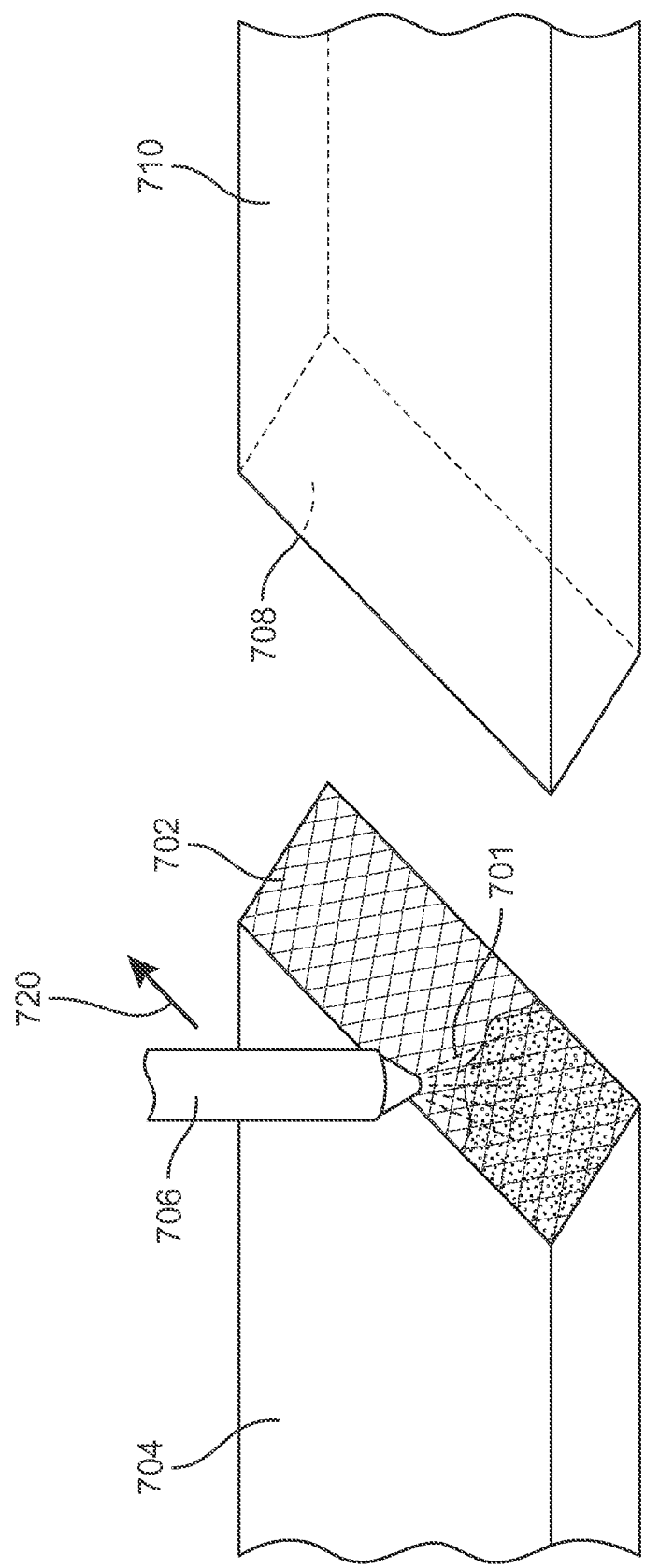
FIG. 7 is a schematic illustration of an application of adhesive step to primed substrate of an embodiment of a method of the disclosure.

In embodiments of the disclosure, adhesive or bonding agent then may be applied to the thus-primed surfaces, which also may be dried before adhesive application. FIG. 7 illustrates application of adhesive 701 to primed or primed and dried surface 702 of substrate 404. Adhesive typically may be applied by spraying adhesive through pipe or tube 706 onto primed or primed and dried surface 702. Adhesive may be applied to the entirety of primed or primed and dried surface 702 by moving nozzle 706, for example, in the direction of arrow 720, to ensure that the entirety of surface 702 to be bound is coated with adhesive. Adhesive may be applied to primed and dried surface 708 of substrate 710 in the same way. Nozzles may spray adhesive in any direction, and may be used horizontally or vertically in embodiments of the disclosure. Application by nozzle in this manner may allow precise location of adhesive so as not to run onto areas or surfaces that are not intended to be adhered. Other methods of adhesive application may be used in embodiments of the disclosure. For example, adhesive may be spread with a brush, a roller, or a doctor blade.

Characterization of the spatial relationship between or arrangement of the substrates to be bonded may vary. Such characterization serves to provide a convenient tool for discussion of the spatial arrangement of substrate surfaces to be bonded. In embodiments of the disclosure, the surfaces to be bonded may have any spatial relationship to each other. For example, embodiments of the disclosure may be characterized as embodiments in which substrates are in a side-by-side relationship. In a side-by-side relationship, substrates are adjacent to or abutted with each other. Another spatial relationship of the arrangement of the substrates in embodiments of the disclosure may be considered to form a laminate structure, with the substrates in a stacked relationship.

FIGS. 2-7 illustrate with particularity embodiments of the disclosure in which a first surface of a first substrate is bonded with a second surface of a second substrate in adjacent or abutted relationship. The abutted or adjacent substrates are bonded to form a composite article that has substrates that may be considered adjacent to or abutted with each other to form a composite article.

Cleaning fluid, primer, and adhesive may be applied to any surface of a substrate in accordance with embodiments of the disclosure illustrated in FIG. 2 through FIG. 7. For example, in embodiments of the disclosure, substrates may be placed adjacent each other so as to form a composite article having substrate portions that may be considered adjacent to or abutted with each other, and bonded as illustrated in FIG. 2 through FIG. 7. Similarly, in other embodiments of the disclosure, substrates placed in stacked relationship also may be treated in accordance with method steps illustrated in FIG. 2 through FIG. 7.

Figure 8:
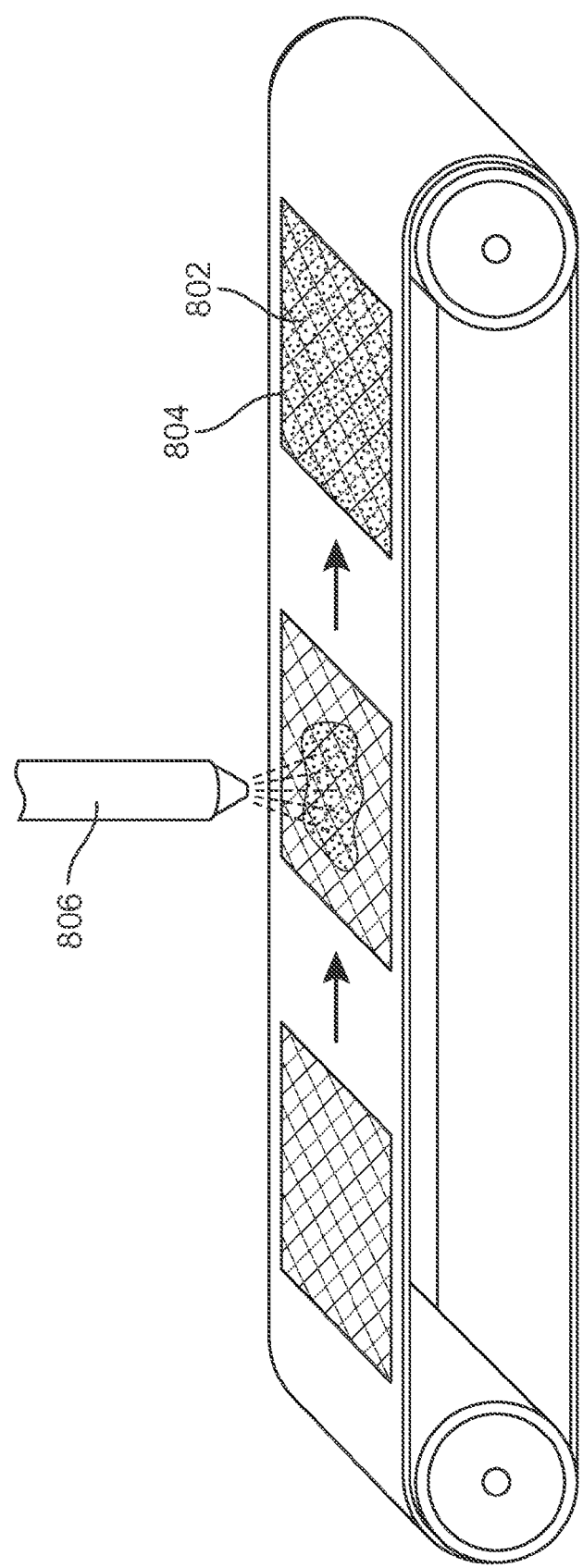
FIG. 8 is a schematic illustration of another embodiment of an application of adhesive step to primed substrate of an embodiment of a method of the disclosure.

An alternative method that may be used in embodiments of the disclosure is illustrated in FIG. 8. As illustrated in FIG. 8, adhesive may be applied, often to a relatively larger primed surface of substrate 804, from hoses 806. Substrate 804 may be moved in the direction of the arrows toward further processing on continuous belt 810. As the user recognizes, the application method illustrated in FIG. 8 also may be used to apply any water-borne composition, such as wash fluid or primer, in accordance with embodiments of the disclosure.

Figure 9:
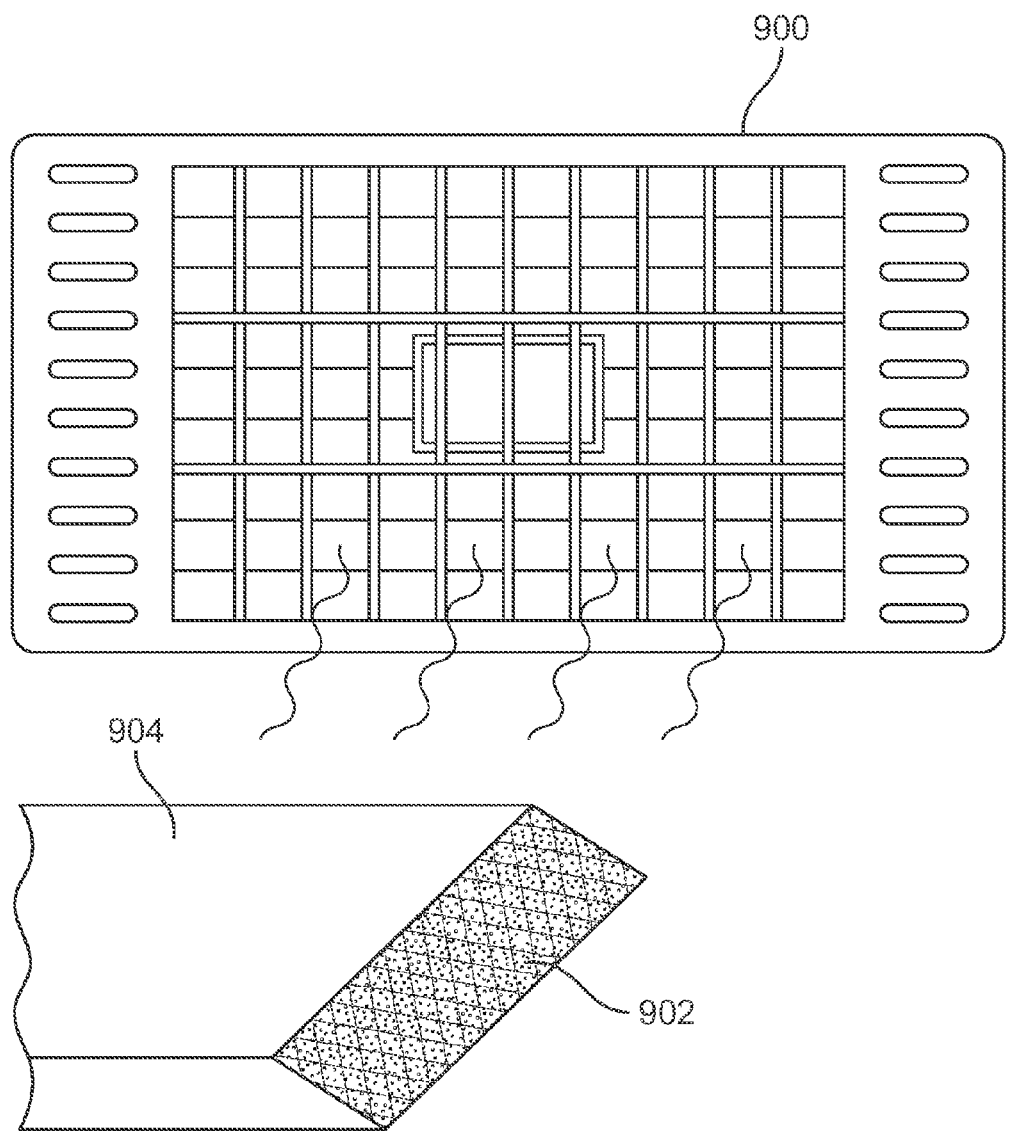
FIG. 9 is a schematic illustration of a heating step of an embodiment of a method of the disclosure.
Figure 10:
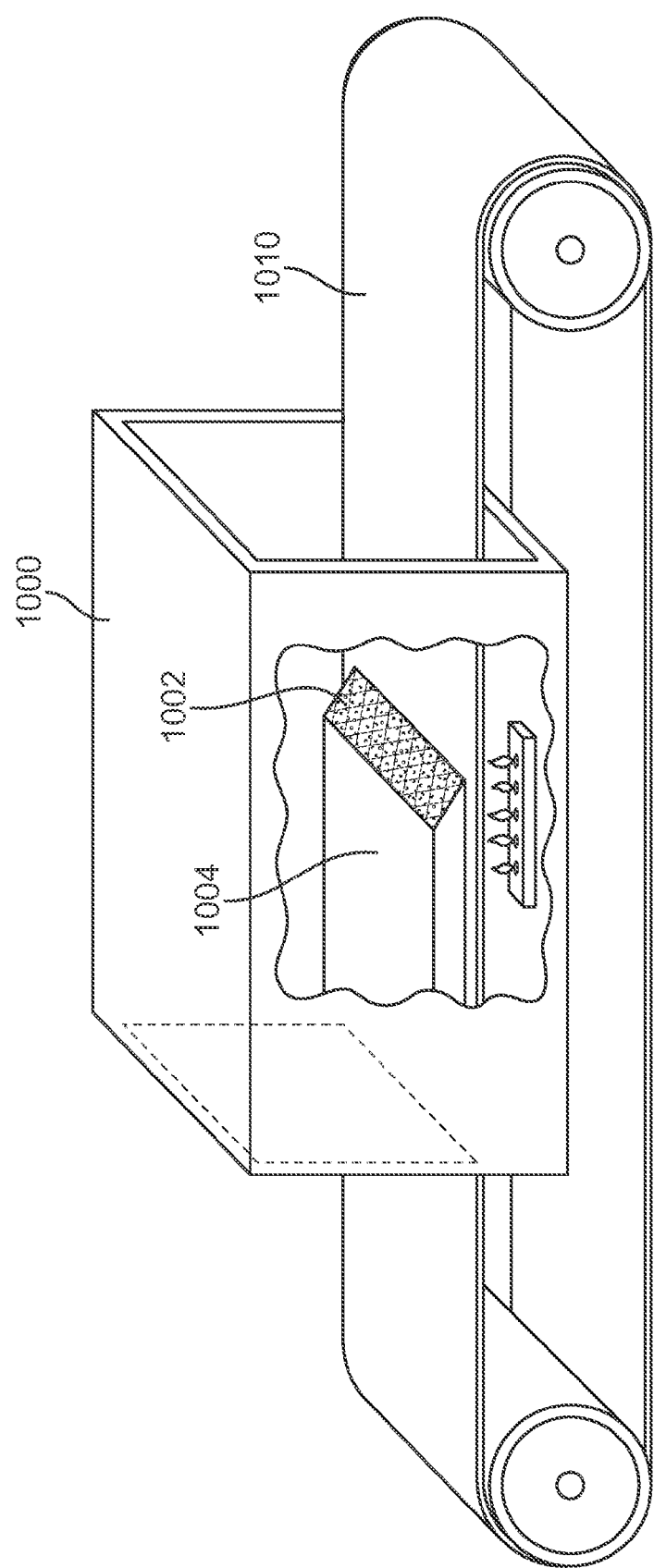
FIG. 10 is a schematic illustration of another embodiment of a heating step of an embodiment of a method of the disclosure.

In embodiments of the disclosure, adhesive may be dried and activated before the surfaces of the substrates are bonded to each other. FIG. 9 and FIG. 10 illustrate this adhesive drying and activating step of the method of embodiments of the disclosure. In embodiments of the disclosure, a surface of a substrate coated with adhesive may be heated for a time and at a temperature sufficient to dry the surface and to activate the adhesive. The surface may be dried in any suitable matter. FIG. 9 illustrates heater 900 imparting heat to surface 902 of substrate 904. Heater 900 may blow heated gas across surface 902 in embodiments of the disclosure. Heater 900 may irradiate surface 902 of substrate 904 with infrared irradiation in embodiments of the disclosure. FIG. 10 illustrates heating surface 1002 of substrate 1004 in oven 1000. Substrate 1004 may be carried through oven 1000 on continuous belt 1010, for example.

Figure 11:
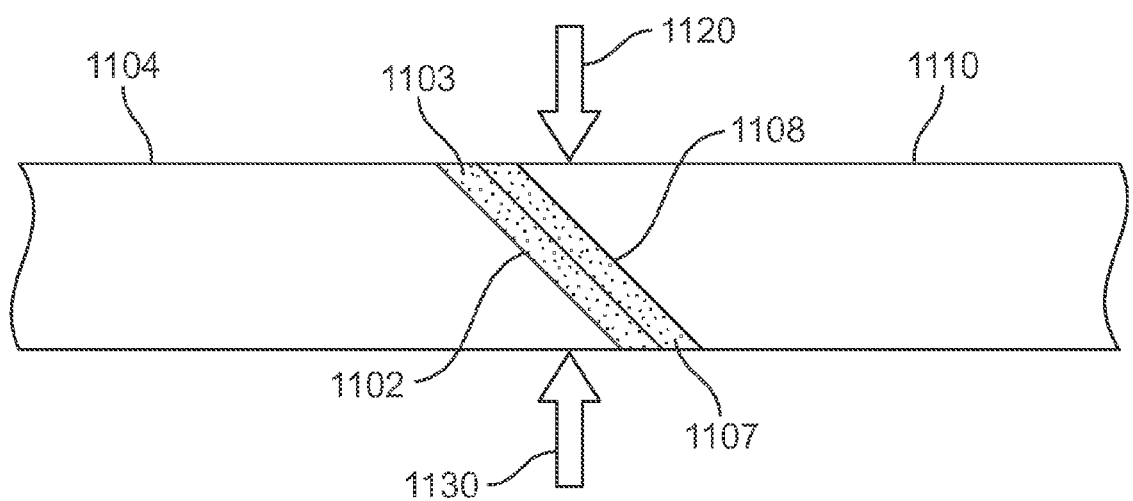
FIG. 11 is an illustration of a composite article having a side-by-side arrangement of substrates in an embodiment of the disclosure.

Substrate surfaces with adhesive thereon then may be brought into mutual contact. The adhesive may be dried and activated before bringing the surfaces into mutual contact. FIG. 11 illustrates embodiments of the disclosure wherein first surface 1102 of first substrate 1104 with adhesive 1103 thereon and second edge surface 1108 of second substrate 1110 with adhesive 1107 thereon are brought into mutual contact in a side-by-side relationship. In these embodiments of the disclosure, substrates may be considered to be bonded adjacent to, abutting, or next to each other in side-by-side relationship.

In embodiments of the disclosure, pressure may be applied to the substrates after they have been brought together to improve the bond. In FIG. 11, pressure indicated by first arrow 1120 and second arrow 1130 is applied for a time and at a temperature sufficient to form a bond.

Figure 12:
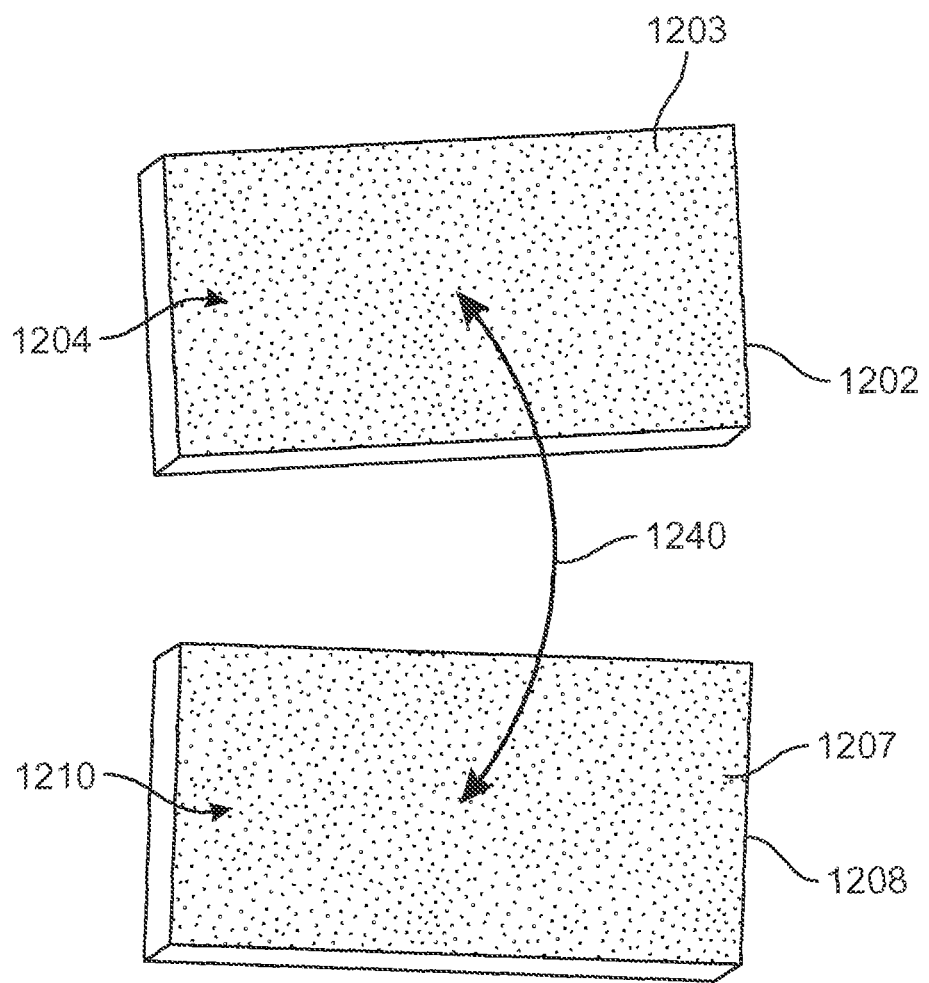
FIG. 12 is an illustration of assembly of a composite article having a stacked or layered arrangement of substrates in an embodiment of the disclosure.
Figure 13:
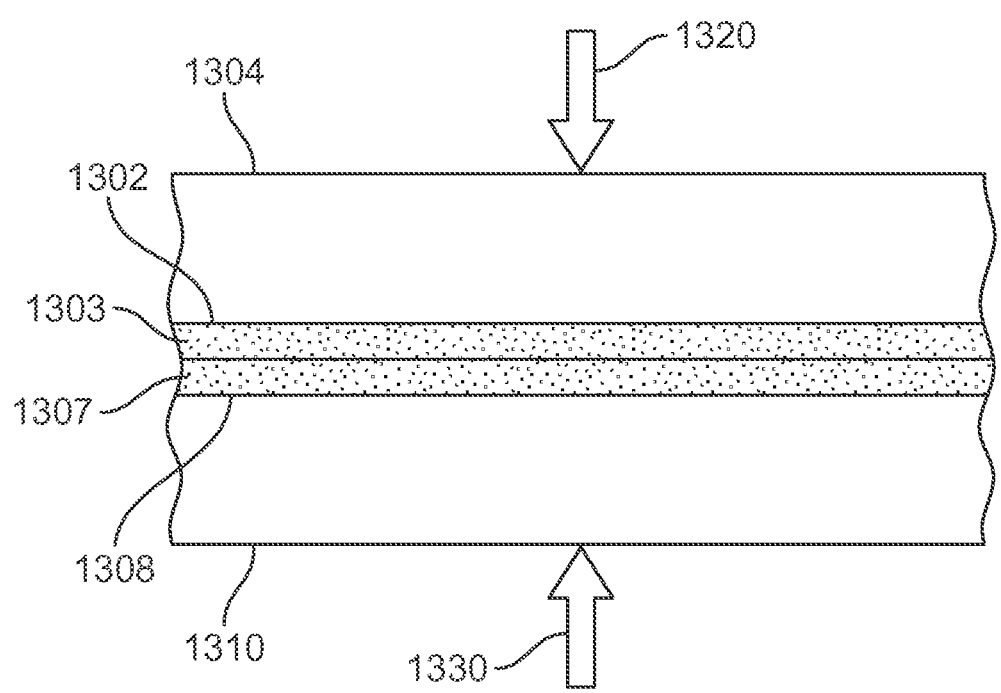
FIG. 13 is an illustration of a composite article having a stacked or layered arrangement of substrates in an embodiment of the disclosure.

FIG. 12 illustrates embodiments of the disclosure wherein a first substrate and a second substrate may be bonded to form a composite article having the substrates stacked on each other to form a laminate-type composite article. FIG. 13 depicts such a composite article, which may be considered to be in the form of a laminate, i.e., stacked or layered layers rather than abutting or adjacent layers.

FIG. 12 illustrates embodiments of the disclosure wherein first surface 1202 of first substrate 1204 with adhesive 1203 thereon and second surface 1208 of second substrate 1210 with adhesive 1207 thereon are brought into mutual contact. Arrow 1240 illustrates that the first surface with adhesive and the second surface with adhesive are brought into mutual contact in a stacked relationship.

FIG. 13 illustrates laminate 1300 comprising first substrate 1304 having first adhesive layer 1303 adhered to second substrate 1310 having second adhesive layer 1307. Pressure indicated by first arrow 1220 and second arrow 1230 is applied for a time and at a temperature sufficient to form a bond between the two substrates.

The wash fluid, which also may be used for degreasing rubber material substrates, may be any fluid that removes from surfaces to be bonded material that may interfere with formation of a bond. Material that may interfere with bond formation includes release agents, mold lubricants, dust, dirt, and other loose particles such as cutting residue, from surfaces to be bonded. The quantity of wash fluid is sufficient to remove the contaminants within about 3 minutes, typically between about 5 seconds to about 90 seconds, more typically between about 10 seconds and about 60 seconds.

These contaminants may be removed by washing or otherwise cleaning with an aqueous cleaner. Any suitable cleaner may be used. Suitable products may be commercially available as products called degreasers. In embodiments of the disclosure, aqueous solutions comprising oxalic acid may be used. Oxalic acid and similar acidic compounds, in aqueous washing solution, may enhance the surface functionality of the anhydride groups and partial esters in the blend of PEBA and styrene/maleic anhydride. A cleaned surface in embodiments of the disclosure is a surface prepared for bonding.

In embodiments of the disclosure, prepared surfaces to be bonded typically may have an aqueous primer applied thereto before aqueous adhesive is applied. Aqueous primer, also known as water-borne primer, is commercially available from a number of suppliers. In embodiments of the disclosure, the same primer is used on both substrates. However, in embodiments of the disclosure, different primers may be used on the dissimilar substrates. Typically, primer may be selected to ensure compatibility with adhesive to be used. For example, a blend of PEBA and styrene/maleic anhydride may be primed with a water-borne primer such as NP UE-8SF, available from Nan Pao Resins. A hardener composition may be added to enhance bonding strength and heat resistance. One such hardener composition is available under the trade name CL-16 from Nan Pao Resins. This composition is suitable for priming surfaces to be bonded with a water-borne adhesive, particularly with a water-borne polyurethane adhesive.

In embodiments of the disclosure wherein one of the substrates is rubber material, a water-borne primer may be a dispersion solution. A dispersion solution comprises a dispersion of priming compositions in a small amount of organic solvent, which solvent is soluble in water. An example of such a water-borne priming dispersion solution for rubber material substrate is GE 005AB, available from Greco Products. GE 005AB is a water-borne primer for surface treating of rubber material. The organic solvent is acetone present in a concentration of less than about 15 percent of the total solution weight. Acetone acts as dispersant for the primer and is soluble in water. This primer is particularly suited for use with water-borne polyurethane adhesive in embodiments of the disclosure.

After primer is applied to the surfaces to be bonded, the surfaces may be heated for a time and at a temperature sufficient to dry the primer. As temperature increases, time required to dry the surface to a selected level decreases. In embodiments of the disclosure, the surfaces are heated for between about 10 seconds and about 1000 seconds, typically between about 30 seconds and about 300 seconds, and more typically between about 100 seconds and about 250 seconds. In embodiments of the disclosure, the temperature during heating may be between about 77° F. (about 25° C.) and about 212° F. (about 100° C.), typically between about 104° F. (about 40° C.) and about 167° F. (about 75° C.). With the guidance provided herein, the user will be able to select conditions appropriate to dry surfaces having water-borne primer thereon.

In embodiments of the disclosure, adhesive may be applied to surfaces having primer, which may be dried, thereon. In embodiments of the disclosure, the adhesive applied to each primed substrate surface may be the same. In embodiments of the disclosure, the adhesive applied to each primed substrate surface may be different. Typically in embodiments of the disclosure, the same adhesive is used on both a substrate comprising a blend of PEBA and styrene/maleic anhydride and a rubber material substrate.

A water-borne polyurethane adhesive may be used. In embodiments of the disclosure, a water-borne polyurethane adhesive may be NP-57 water-borne polyurethane adhesive, commercially available from Nan Pao Resins. Other water-borne adhesives, including water-borne polyurethane adhesives, may be used to bond the surfaces of the substrates. Adhesive may be applied to a primed surface that remains warm after heating to dry the primer. The substrate surfaces may be cooled before application of adhesive. In embodiments of the disclosure, adhesive may be applied to a cooled surface or a warmed surface.

After adhesive is applied to the surfaces to be bonded, the surfaces may be heated for a time and at a temperature sufficient to dry the surface and to activate the water-borne adhesive. As temperature increases, time required to dry the surface to a selected level decreases. In embodiments of the disclosure, the surfaces are heated for between about 10 seconds and about 1000 seconds, typically between about 30 seconds and about 300 seconds, and more typically between about 100 seconds and about 250 seconds. Typically, in embodiments of the disclosure, the adhesive is activated during this heating period. In embodiments of the disclosure, the temperature during heating may be between about 77° F. (about 25° C.) and about 212° F. (about 100° C.), typically between about 104° F. (about 40° C.) and about 167° F. (about 75° C.). With the guidance provided herein, the user will be able to select conditions appropriate to dry surfaces having water-borne adhesive thereon. The user also will be able, with the guidance provided herein, to select conditions appropriate to activate the water-borne adhesive.

The substrate surfaces having water-borne adhesive thereon may be moved into mutual contact and bonded to each other to form a composite article. Pressure may be applied to the bonding surfaces to increase bonding strength. Pressure may be applied immediately after heating the adhesive, or may be applied to cooled surfaces. Pressure may be applied after the surfaces are moved into mutual contact and are still warm, i.e., above a 77° F. (about 25° C.). Pressure may be applied by platens or any suitable manner. In embodiments of the disclosure, applied pressure typically is between about 10 kg/cm$^2$ and about 100 kg/cm$^2$, more typically is between about 15 kg/cm$^2$ and about 75 kg/cm$^2$, and most typically is between about 20 kg/cm$^2$ and about 50 kg/cm$^2$. In embodiments of the disclosure, pressure may be maintained for between about 5 seconds and about 50 seconds, typically between about 8 seconds and about 30 seconds, and more typically between about 10 seconds and 20 seconds. With the guidance provided herein, the user will be able to select a suitable combination of time and pressure to enhance bonding strength.

Embodiments of the disclosure enable bonding of a blend of PEBA and styrene/maleic anhydride copolymer using only water-borne compositions to form a bond having strength comparable to known organic solvent-based bonding methods. Bond strength may be measured by adhering substrates and measuring the force required to break the bond between the substrate surfaces. Thus, bond strength may be measured in terms of kg per width of bond separated, or kg/cm. Bond strength also may be called peel strength.

Bond strength may change with time. Typically, bond strength may increase with time. Therefore, bond strength may be measured after a relatively short time and then after a relatively longer time. For example, bond strength may be measured after 24 hours at a temperature that may be ambient i.e., between about 68° F. (20° C.) and about 77° F. (25° C.). To ensure product integrity during the lifetime of the product, an accelerated aging bond test may be performed. The product is aged for 5 days at 70° C., allowed to cool to room temperature, and then a bond test is performed.

The bond strength typical for different applications may be different. For example, whereas a bond strength of at least about 4 kg/cm may be typical for one application, a typical bond strength for another application may be at least about 5 kg/cm. Similarly, a typical bond strength of at least about 2.5 kg/cm may be appropriate for another application. With the guidance provided herein, the user will be able to select a suitable bond strength for a particular application.

Embodiments of the disclosure include composite articles made in accordance with the methods disclosed herein. Any composite article or object comprising a PEBA substrate or portion and a dissimilar portion or substrate may be made. For example, in embodiments of the disclosure, rubber material may be bonded to PEBA-containing plastic to provide a relatively flexible area similar to a hinge between relatively inflexible PEBA surfaces. In embodiments of the disclosure, rubber material also may be bonded to a PEBA surface to provide areas that protect a PEBA surface from damage such as scuffs and abrasion, for example. PEBA material may be used to protect rubber material from damage, for example, in the form of a grommet.

It may be advantageous to include parts of footwear comprising PEBA substrates and rubber material substrates adhered or bonded to each other. Similarly, it may be advantageous to form luggage tags, livestock tags, and other composite articles from PEBA-containing materials and dissimilar material such as rubber material.

Figure 14:
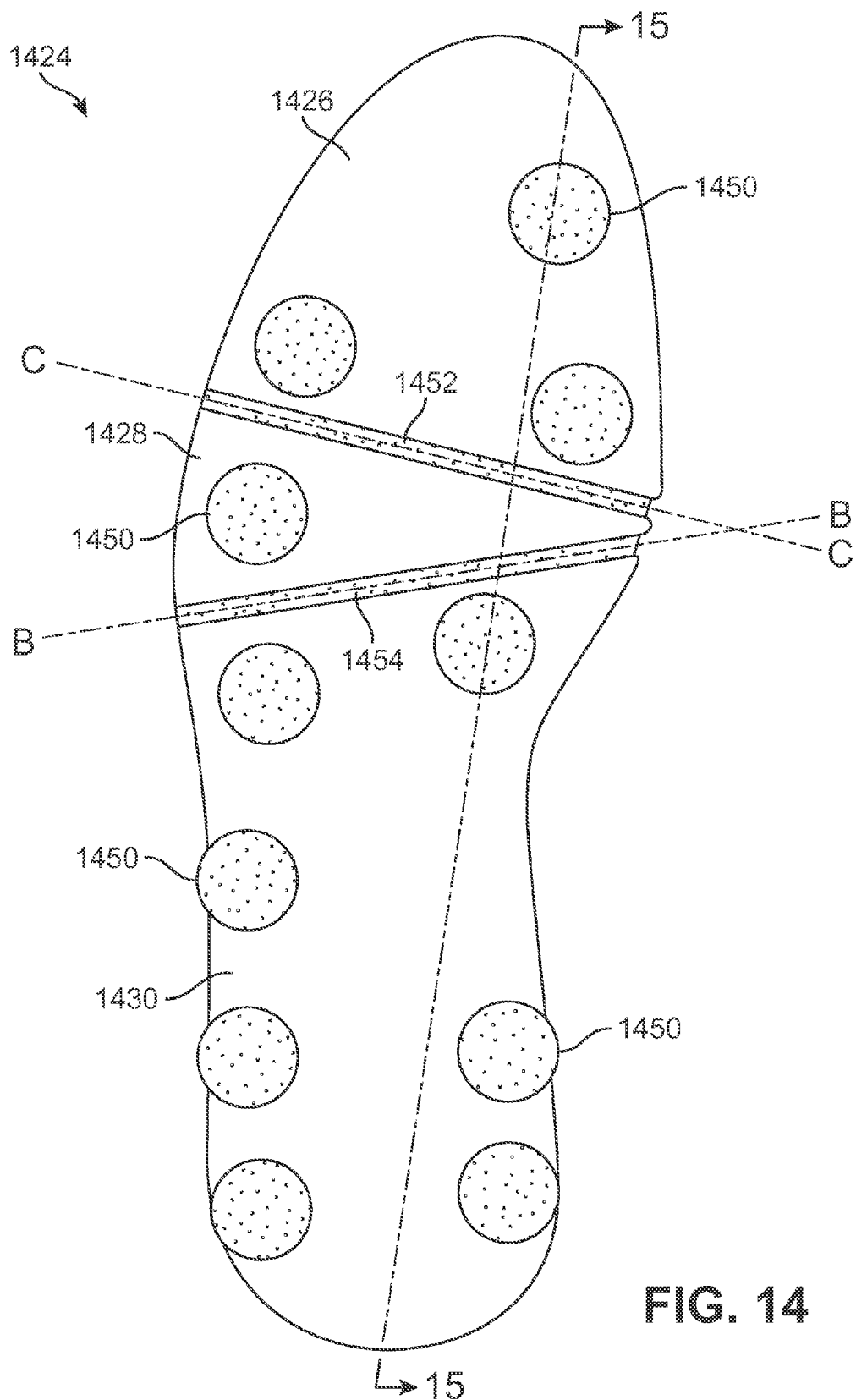
FIG. 14 illustrates a bottom view of a composite article in the form of a footwear sole embodiment of the disclosure.

FIG. 14 illustrates a bottom view of a sole 1424 for footwear. Sole 1424 comprises forefoot segment 1426, midfoot segment 1428, and heel segment 1430 of a blend of PEBA and styrene/maleic anhydride. First flexible member 1452 is bonded to forefoot segment 1426 and midfoot segment 1428 along a line of flexion B-B. Second flexible member 1454 is bonded to midfoot segment 1428 and heel segment 1430 along a line of flexion C-C. Thus, first flexible member 1452 and second flexible member 1454 enhance the flexibility of sole 1424.

FIG. 14 also illustrates a plurality of traction elements 1450. If sole 1424 is used as an outer sole, traction elements 1450 may be ground contacting elements or ground engaging elements, for example. Traction elements 1450 may comprise rubber material. Traction elements 1450 may be arranged on sole 1424 in any suitable manner.

Figure 15:
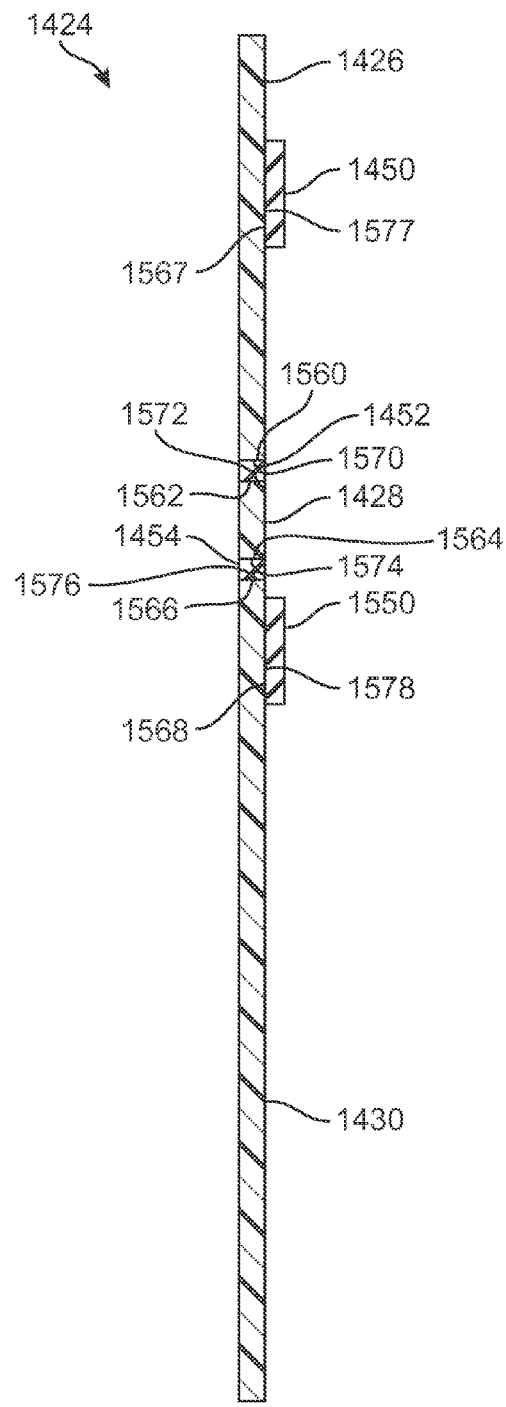
FIG. 15 illustrates a side view along section line 2-2 of the composite article of FIG. 14.
Figure 16:
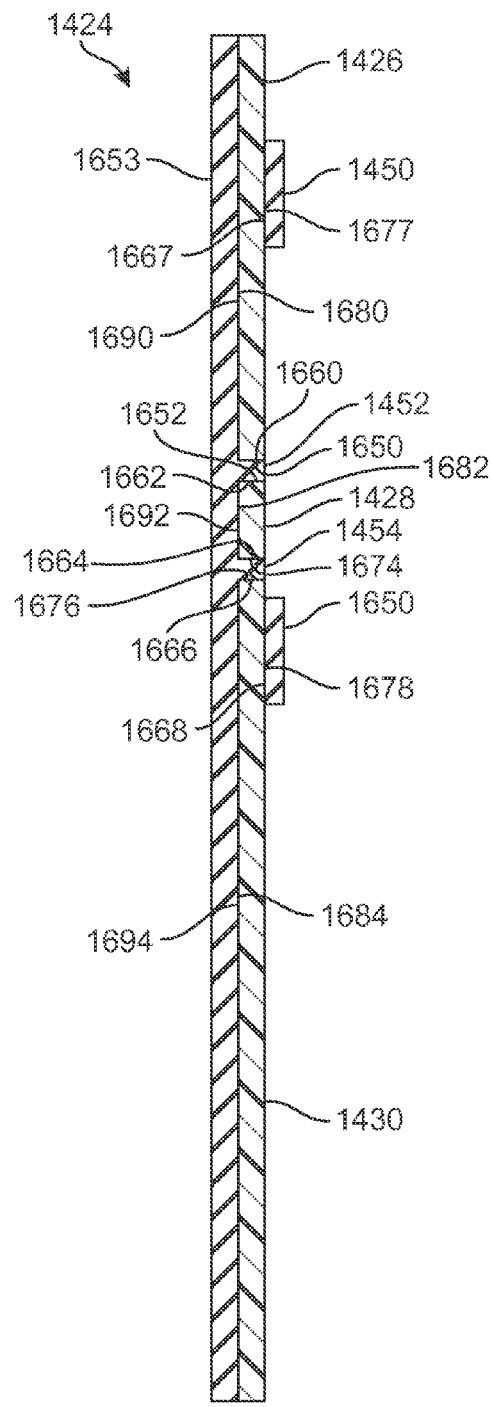
FIG. 16 illustrates another side view along section 2-2 of the composite article of FIG. 14.

FIG. 15 and FIG. 16 illustrate side views of different embodiments of the disclosure of footwear sole 1424 of FIG. 14, as illustrated along section line 15-15. FIG. 15 illustrates a side view of first flexible member 1452 bonded at first flexible surface 1570 to first PEBA surface 1560 of forefoot segment 1426 and at second flexible surface 1572 of first flexible member 1452 to second PEBA surface 1562 of midfoot segment 1428 in an abutting or side-by-side relationship. Similarly, second flexible member 1454 is bonded at third flexible surface 1574 to third PEBA surface 1564 of midfoot segment 1428 and at fourth flexible surface 1576 to fourth PEBA surface 1566 of heel segment 1430 in an abutting or side-by-side relationship. FIG. 15 also illustrates a stacked, layered, or laminate-type structure where first traction element 1450 is bonded to forefoot segment 1426 and second traction element 1550 is bonded to heel segment 1430. Fifth flexible surface 1577 of first traction element 1450 is bonded in stacked relationship to an area of fifth PEBA surface 1567 of forefoot segment 1426 and sixth flexible surface 1578 of second traction element 1550 is bonded in stacked relationship to an area of sixth PEBA surface 1568.

FIG. 16 illustrates a side view of second embodiment of footwear sole 1424 wherein flexible element 1653 is essentially co-extensive and in a stacked or layered relationship with forefoot segment 1426, midfoot segment 1428, and heel segment 1430. FIG. 16 thus illustrates two types of laminate structures and side-by-side structures. Flexible sole element 1653 includes first flexible member 1452 and second flexible member 1454 formed integrally therewith. Flexible sole element 1653 is bonded to forefoot segment 1426, midfoot segment 1428, and heel segment 1430. First flexible member 1452 may be bonded to forefoot segment 1426, to midfoot segment 1428, or to both, and second flexible member 1454 may be bonded to midfoot segment 1428, to heel segment 1430, or to both.

As shown in FIG. 16, seventh flexible surface 1690 of flexible sole element 1653 is bonded to seventh PEBA surface 1680 of forefoot segment 1426, eighth flexible surface 1692 of flexible sole element 1653 is bonded to eighth PEBA surface 1682 of midfoot segment 1428, and ninth flexible surface 1694 of flexible sole element 1653 is bonded to ninth PEBA surface 1684 of heel segment 1430.

If first flexible member 1452 also is bonded to a PEBA segment, first flexible member 1452 may be bonded at first flexible surface 1670 to first PEBA surface 1660 of forefoot segment 1426, may be bonded at second flexible surface 1672 of first flexible member 1452 to second PEBA surface 1662 of midfoot segment 1428, or may be bonded at both flexible surfaces, in an abutting or side-by-side relationship. Similarly, if second flexible member 1454 is bonded to a PEBA segment, second flexible member 1454 may be bonded at third flexible surface 1674 to third PEBA surface 1664 of midfoot segment 1428, may be bonded at fourth flexible surface 1676 to fourth PEBA surface 1666 of heel segment 1430, or may be bonded at both flexible surfaces, in an abutting or side-by-side relationship. FIG. 16 also illustrates a laminate-type structure where first traction element 1450 is bonded to forefoot segment 1426 and second traction element 1650 is bonded to heel segment 1430. Fifth flexible surface 1677 of first traction element 1450 is bonded in stacked or layered relationship to an area of fifth PEBA surface 1667 of forefoot segment 1426 and sixth flexible surface 1678 of second traction element 1650 is bonded in stacked or layered relationship to an area of sixth PEBA surface 1668.

Figure 17:
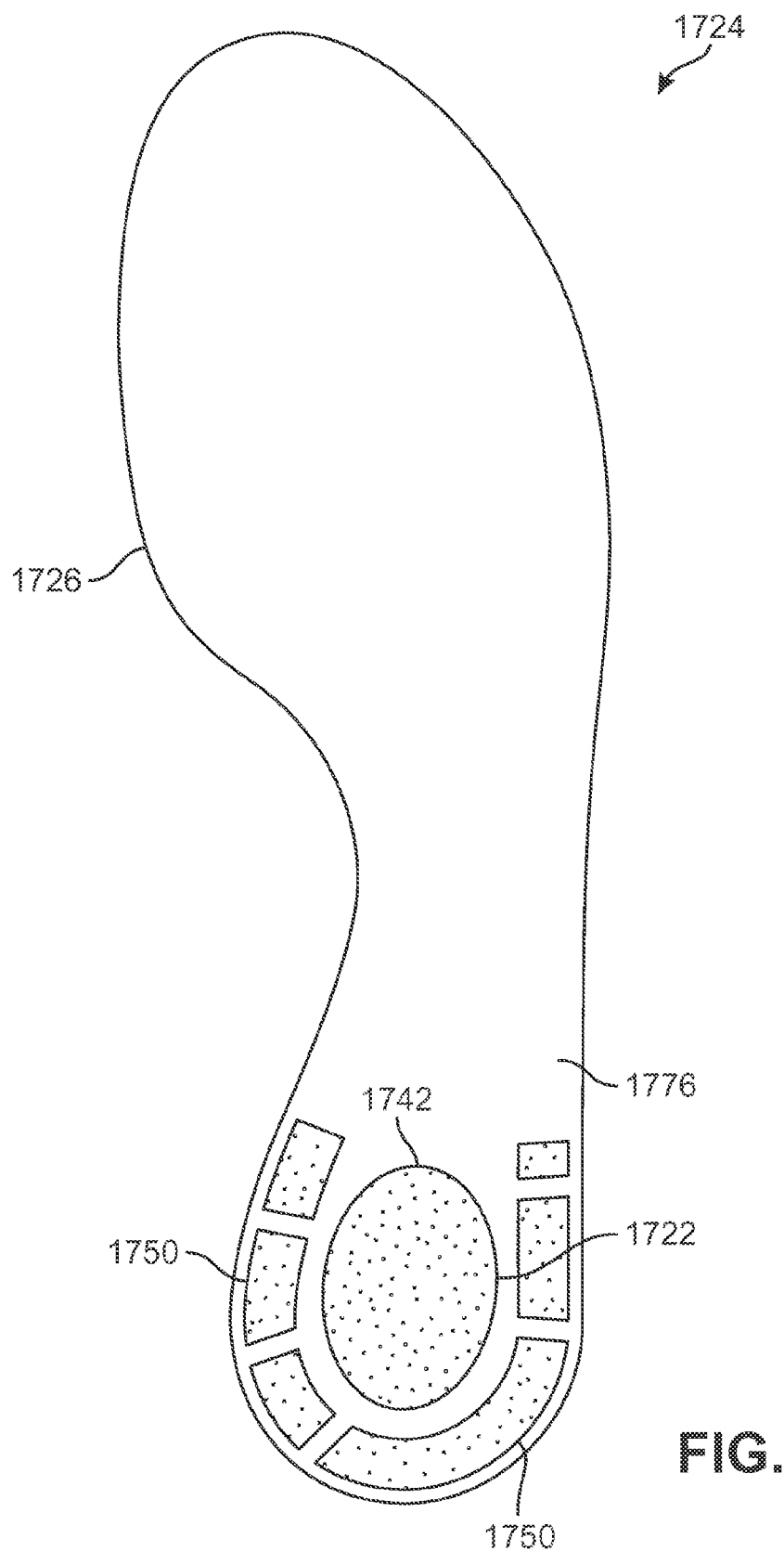
FIG. 17 illustrates a bottom view of a composite article in the form of another footwear sole embodiment of the disclosure.

FIG. 17 illustrates a bottom view of another embodiment of the disclosure of an outsole for footwear. FIG. 17 illustrates outsole 1724 for footwear having both abutting, or side-by-side, bonding and laminate-type bonding. Outsole 1724 includes outsole plate 1726 comprising a blend of PEBA and styrene/maleic anhydride. A plurality of traction elements 1750 are bonded to portions of PEBA surface 1776 that are in stacked or layered relationship with traction elements 1750 to form a laminated-type composite article. The periphery of flexible heel element 1722 is bonded to tenth PEBA surface 1742 to form an abutting, or side-by-side, bond.

Figure 18:
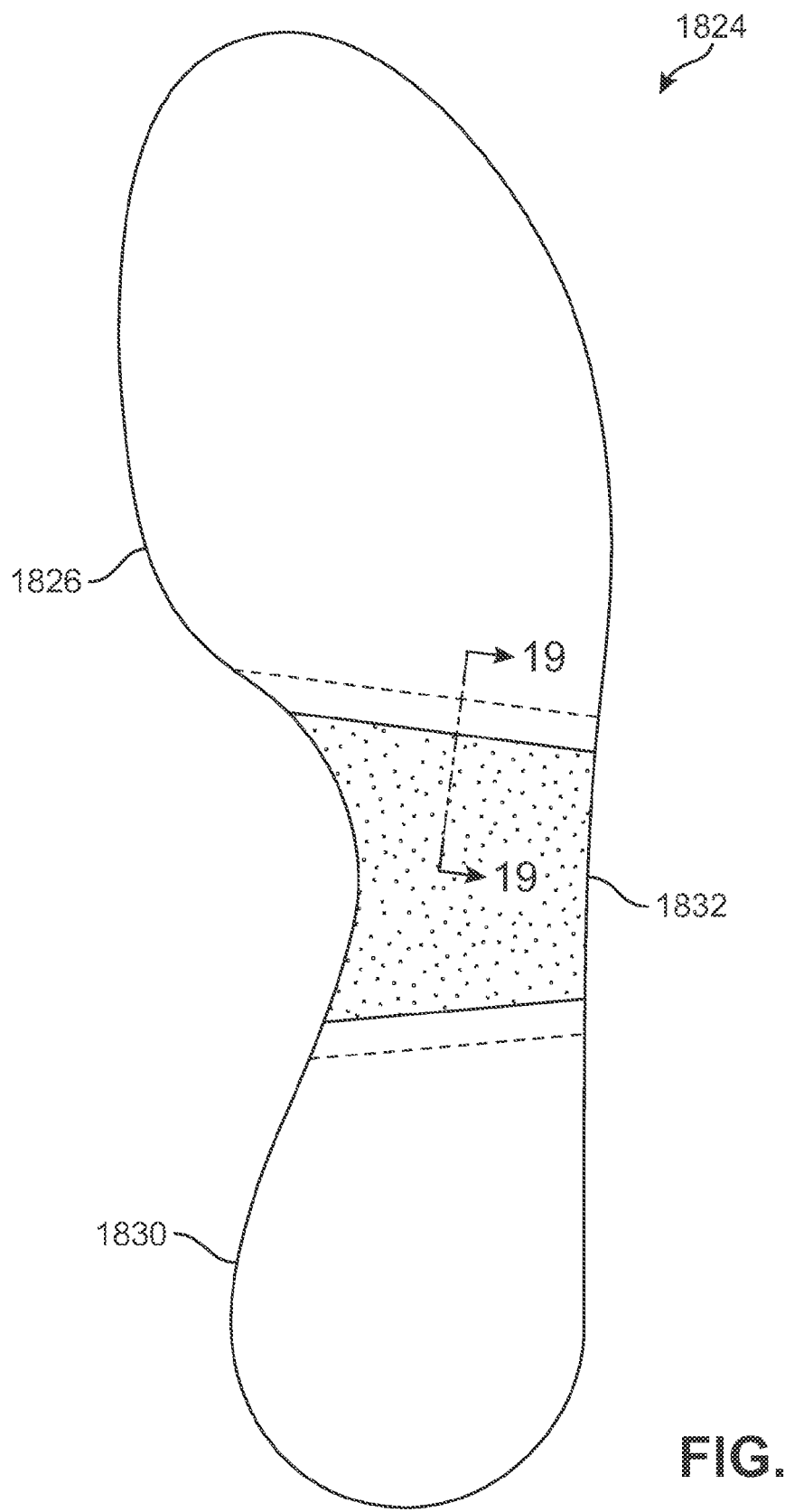
FIG. 18 illustrates a bottom view of a composite article in the form of another footwear sole embodiment of the disclosure.
Figure 19:
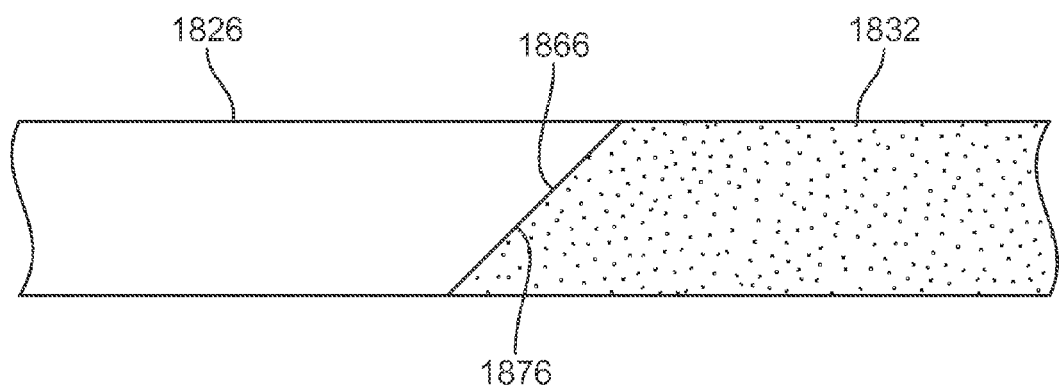
FIG. 19 illustrates a side view along section 19-19 of the composite article of FIG. 18.

FIG. 18 illustrates a bottom view of another embodiment of the disclosure corresponding to a sole for footwear. Sole 1824 comprises forefoot segment 1826 comprising a blend of PEBA and styrene/maleic anhydride and heel segment 1830 comprising a blend of PEBA and styrene/maleic anhydride. Flexible midfoot element 1832 is bonded at one end to forefoot segment 1826 and is bonded at a second end to heel segment 1830. As illustrated by the dashed lines, flexible midfoot element 1832 forms a joint that extends under forefoot segment 1826 and heel segment 1830. Section 19-19, shown in FIG. 19, illustrates a side view of the footwear sole of FIG. 18 having PEBA surface 1866 of forefoot segment 1826 and flexible surface 1876 of flexible midsole 1832 bonded to form an abutting, or side-by-side type joint, to form footwear sole 1824.

Figure 20:
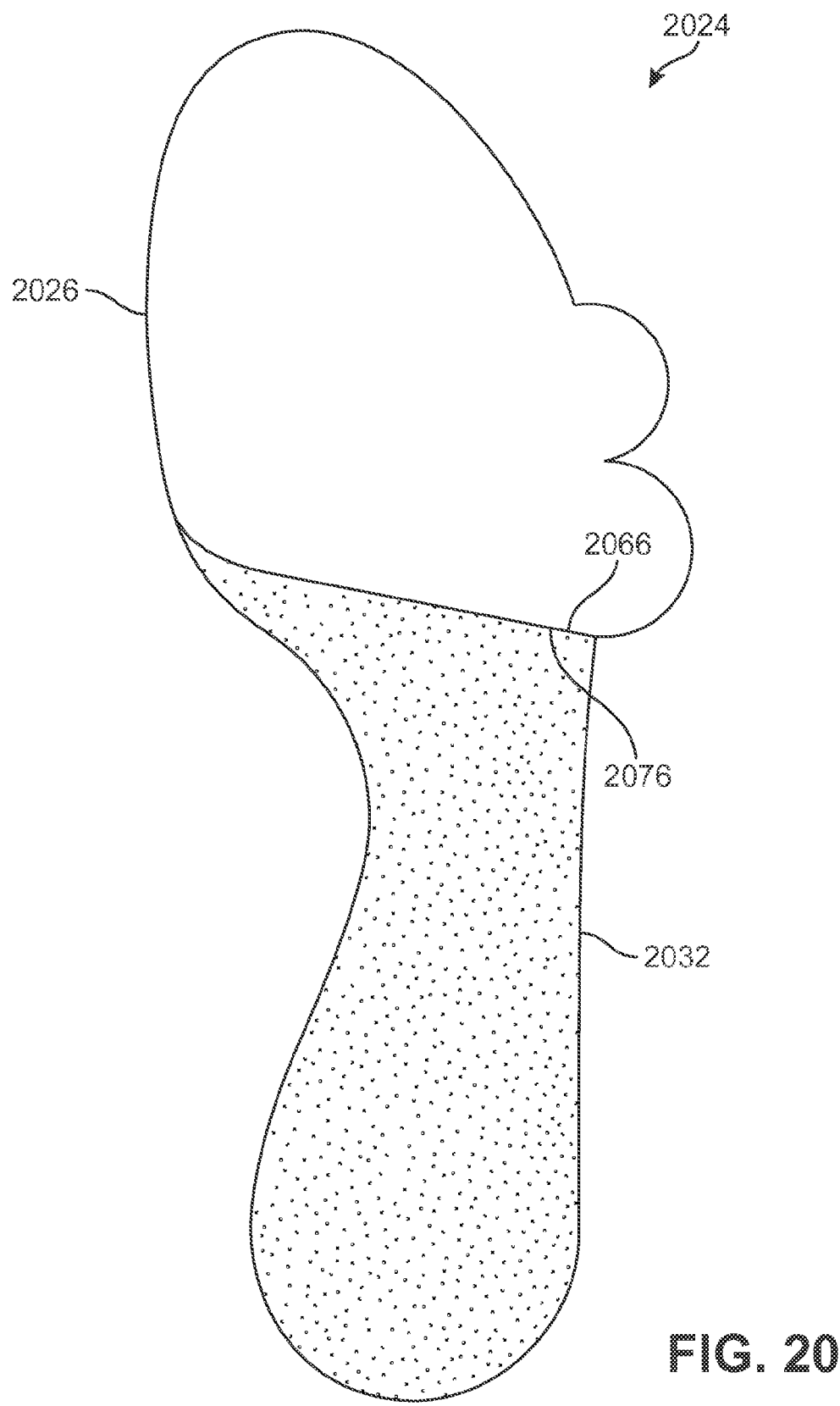
FIG. 20 illustrates a bottom view of another composite article in the form of a footwear sole embodiment of the disclosure.

FIG. 20 illustrates a bottom view of yet another embodiment of the disclosure corresponding to a sole for footwear. Sole 2024 comprises forefoot segment 2026 comprising a blend of PEBA and styrene/maleic anhydride and flexible three-quarter length element 2032. End surface 2066 of forefoot segment 2026 is adhered to flexible end surface 2076 of flexible three-quarter length element 2032 to form an abutting bond.

Figure 21:
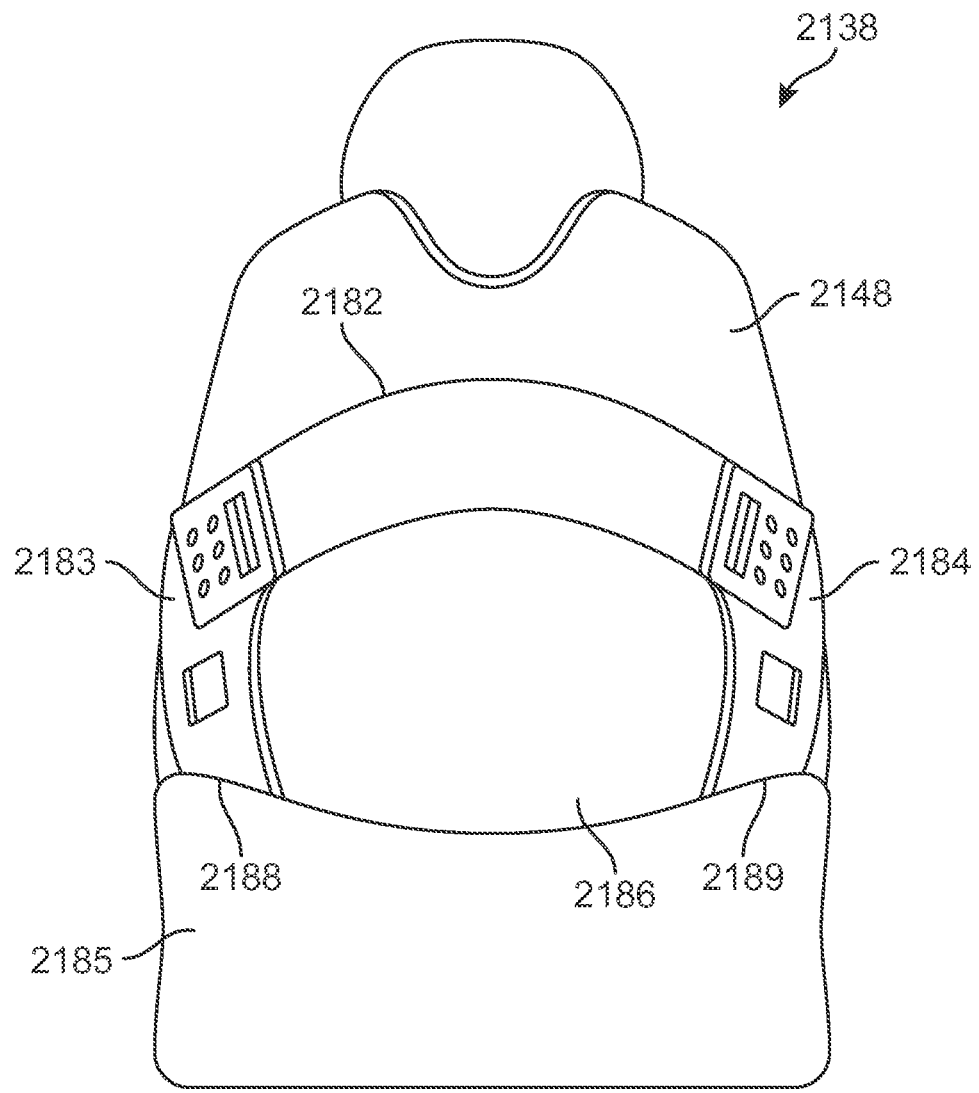
FIG. 21 is a posterior view of a footwear article embodiment of the disclosure.
Figure 22:
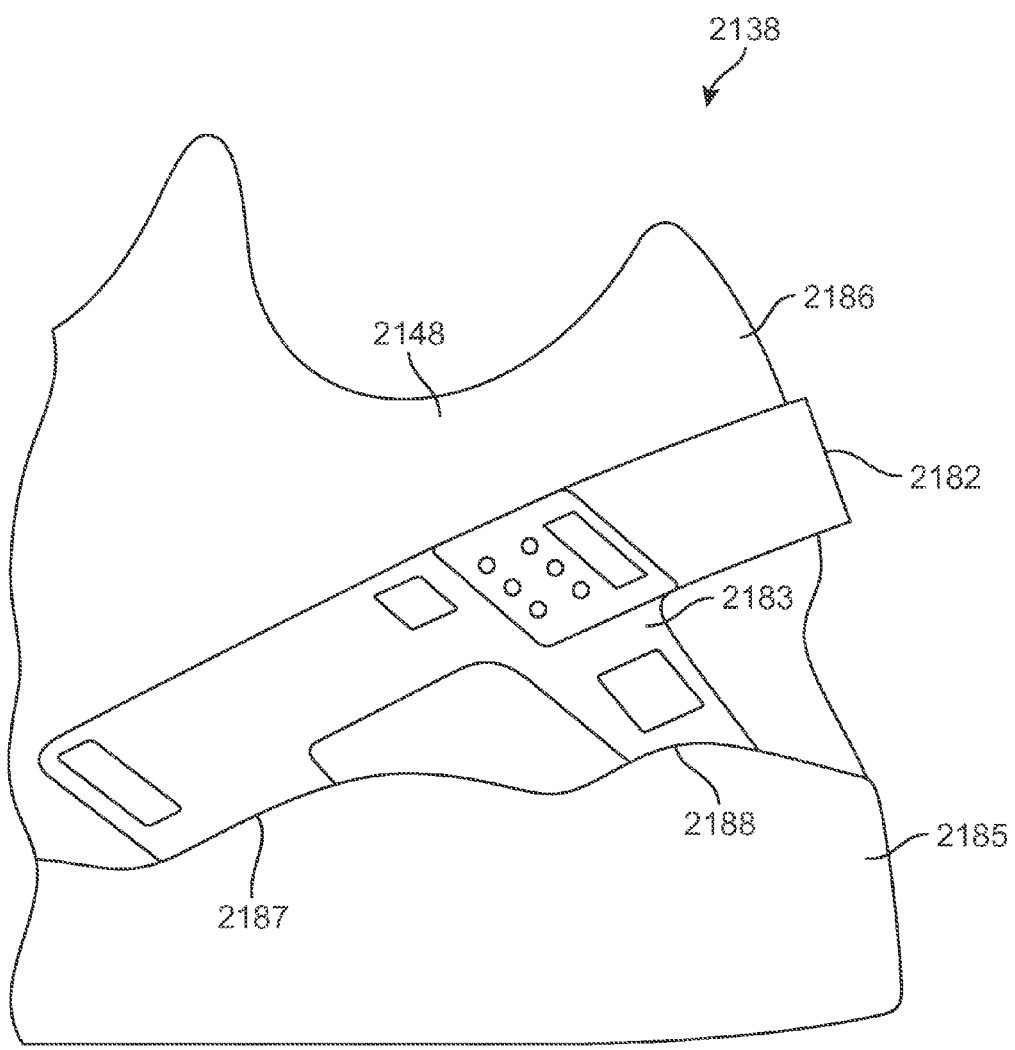
FIG. 22 is a partial lateral view of the footwear article of FIG. 21.

FIG. 21 is a posterior view and FIG. 22 is a partial lateral view of article of footwear 2138 showing a rearfoot strap construction showing substantially laterally located lateral heel counter 2183 and substantially medially located medial heel counter 2184 substantially consisting of a blend of PEBA and styrene/maleic anhydride bonded to support strap 2182 substantially consisting of rubber material which transits behind posterior portion 2186 of shoe upper 2148 and joins lateral heel counter 2183 and medial heel counter 2184. It can be readily understood that other like structures are contemplated for use in other portions of an article of footwear 2138. Further, first anchor portion 2187, second anchor portion 2188, and third anchor portion 2189 of lateral heel counter 2183 and medial heel counter 2184 comprise a blend of PEBA and styrene/maleic anhydride. First anchor portion 2187, second anchor portion 2188, and third anchor portion 2189 may be chemically bonded to the sole 2185 in a manner appropriate to bond the blend of PEBA and styrene/maleic anhydride to the material of construction of sole 2185 at the point of contact. For example, if sole 2185 comprises a rubber material or another appropriate dissimilar material at the point of contact, the surfaces may be bonded in accordance with embodiments of the disclosure. Otherwise, the user will be able to identify a suitable adhesive system.

Figure 23:
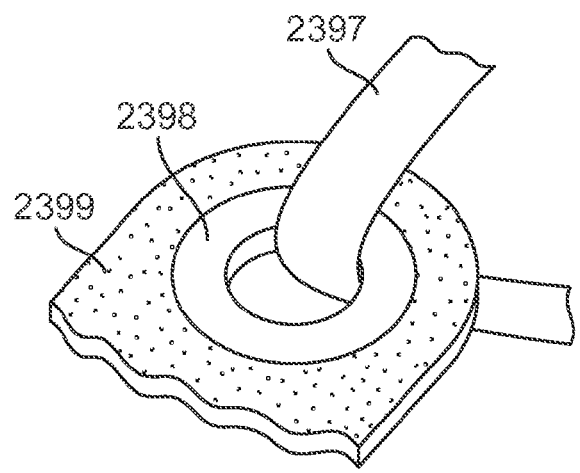
FIG. 23 is a view of a flexible strap embodiment of the disclosure.

Another embodiment of the present invention is shown in FIG. 23. In FIG. 23, a portion of flexible strap 2399, which may be a footwear strap or a tent strap, having a grommet insert 2398 for receiving elongate member 2397, which may be a shoe lace or a tent tie-down, for example, is shown. Flexible strap 2399 may be rubber material or other material dissimilar to grommet insert 2398. Grommet insert 2398 substantially consists of a blend of PEBA and styrene/maleic anhydride to provide a durable surface to elongate member 2397 and is bonded to flexible strap 2397 in accordance with embodiments of the disclosure. This construction may extend the service life of flexible strap 2399 by strengthening the point of contact between flexible strap 2399 and elongate member 2397. Thus, if flexible strap 2399 is on a shoe and elongate member 2397 is a shoe lace, this construction may permit better fit due to the elastic nature of the rubber material utilized for flexible strap 2399.

Figure 24:
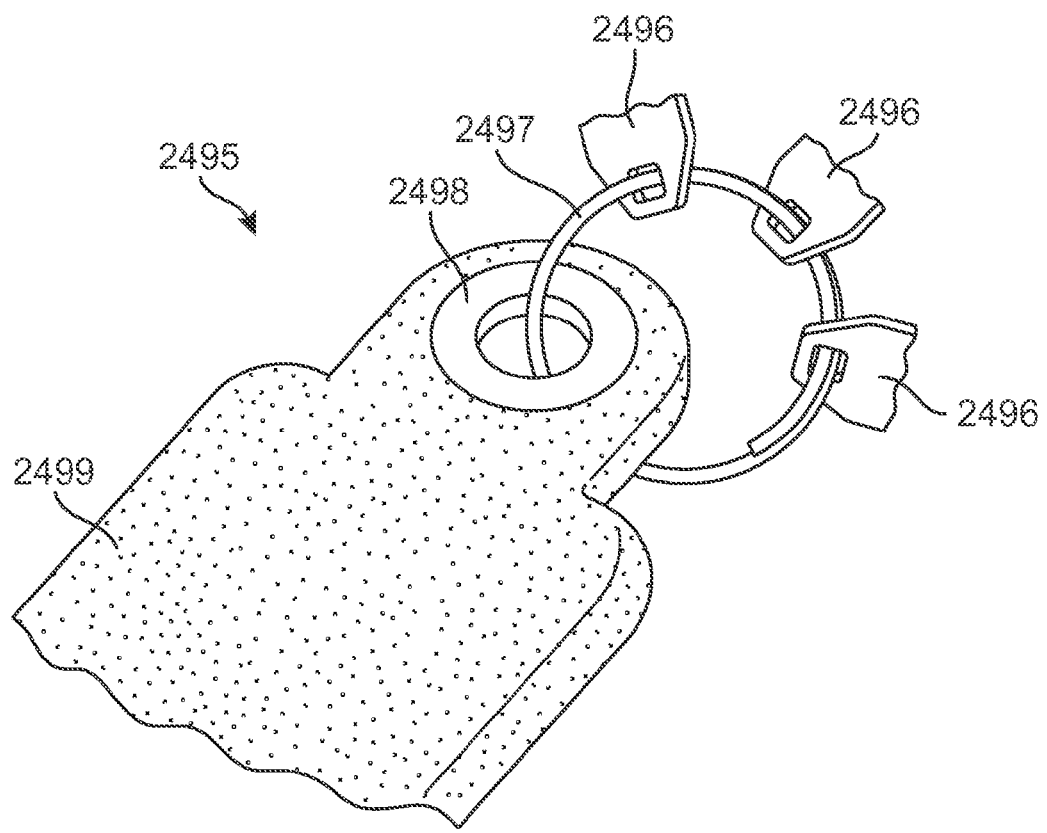
FIG. 24 is a view of another composite article embodiment of the disclosure.
Figure 25:
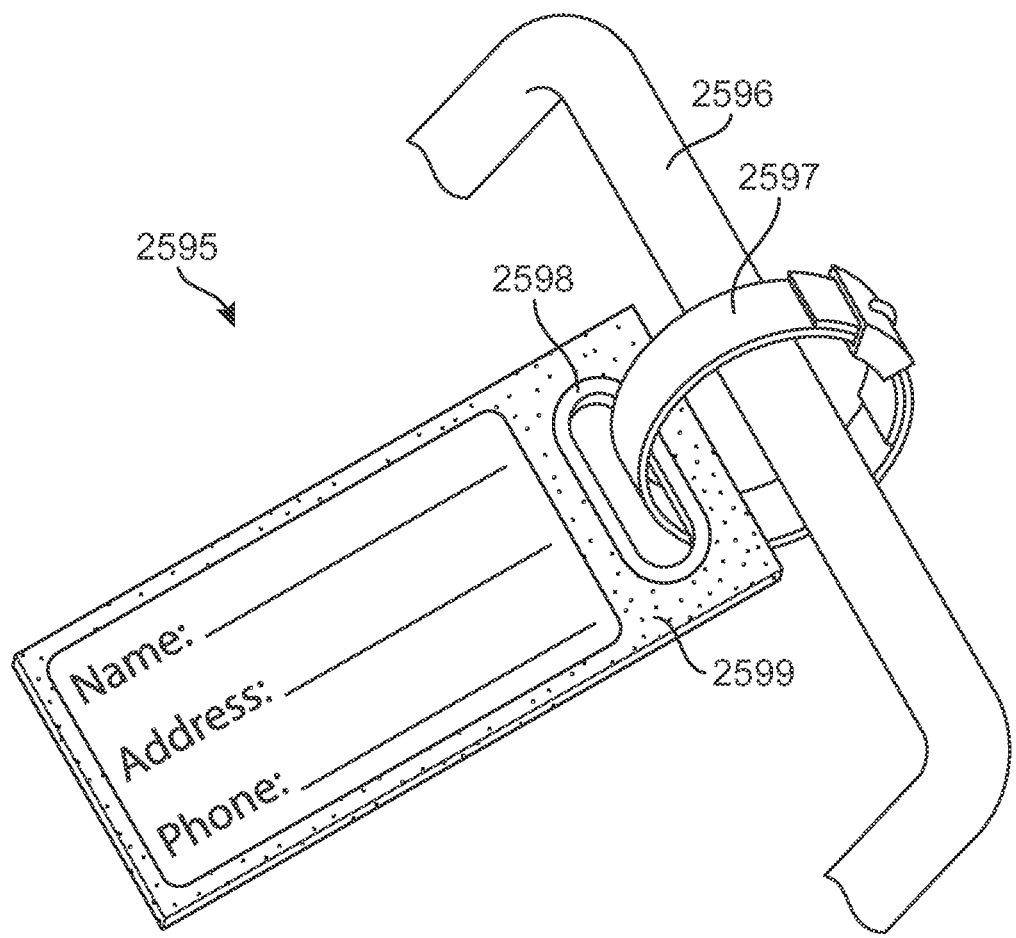
FIG. 25 is a view of a tag composite article embodiment of the disclosure.

Other embodiments of the disclosure involving use of a grommet insert comprising a blend of PEBA and styrene/maleic anhydride are illustrated in FIG. 24 for a key fob 2495 or other type of fob and in FIG. 25 for a luggage tag 2595.

In FIG. 24, a portion of flexible fob 2499 of key fob 2495 made of rubber material is illustrated. Grommet insert 2498 for receiving ring member 2497, which may be a key ring, is shown. Keys 2496 or other items may be placed on ring member 2497. Flexible fob 2499 may be rubber material or other material dissimilar to grommet insert 2498. Grommet insert 2498 substantially consists of a blend of PEBA and styrene/maleic anhydride to present a durable surface to member 2497 and is bonded to flexible fob 2499 in accordance with embodiments of the disclosure. This construction may extend the service life of keychain 2495 by strengthening the point of contact between flexible fob 2499 and member 2497. This embodiment of the disclosure also may be suitable as a livestock tag.

FIG. 25 illustrates luggage tag 2595 comprising flexible tag 2599 made of rubber material with grommet insert 2598 for receiving strap member 2597. FIG. 25 further illustrates handle 2596 to which luggage tag 2595 may be attached. Luggage tag 2599 may be rubber material or other material dissimilar to grommet insert 2598. Grommet insert 2598 comprises a blend of PEBA and styrene/maleic anhydride to provide a durable surface to strap member 2597 and is bonded to luggage tag 2597 in accordance with embodiments of the disclosure. This construction may extend the service life of luggage tag 2595 by strengthening the point of contact between tag 2599 and strap member 2597.

Embodiments of the disclosure include these and other composite articles made in accordance with the method disclosed herein. The following examples are intended to illustrate the invention, not to limit it in any way.

Example 1

A comparison of blends of PEBA and different styrene/maleic anhydride copolymers was made. Pebax® 7033 PEBA was blended with styrene/maleic anhydride copolymer as set forth in Table 1 below to form a blend.

Slabs of the blend of PEBA and styrene/maleic anhydride were bonded to rubber slabs with heating and pressing. Nine bonded slabs of each condition were made.

Slabs of the PEBA/styrene/maleic anhydride blend were washed with either an MEK (solvent) wash (comparative example) or a water-borne wash comprising oxalic acid in solution, as shown in Table 1 below. The water-borne wash also was used on the rubber slab.

After washing, the slabs were primed. Nan Pao UE-8SF water-borne primer was combined with between about 3 percent and 5 percent CL-16 hardener and applied to the blend of Pebax® 7033 and styrene/maleic anhydride. Greco 005AB was used to prime the rubber slabs. All slabs were dried in an oven at a temperature of 55° C. for 200 seconds and then were removed from the oven.

Adhesive then was applied to the surfaces of the dried primed slab surfaces to be bonded. Nan Pao polyurethane adhesive 57 was combined with about 3 percent to about 5 percent CL-16 hardener and applied to the surfaced to be bonded of all the dried primed slabs. The slabs then were dried and the adhesive was activated in an oven at a temperature of 55° C. for 200 seconds and then were removed from the oven.

The surface of a slab of the blend of PEBA and styrene/maleic anhydride to which adhesive had been applied then was moved into contact with the surface of a slab of rubber to which adhesive had been applied and then were pressed together at a pressure of 30 kg/cm² for between 13 seconds and 15 seconds to form a bonded composite article.

The bonded composite articles then were subjected to testing to determine bond strength. Each slab was tested by peeling the substrates apart and measuring the bond, or peel, strength at five times along the peel length. The average of the five bond strength measurements are reported in Table 1 below. The bonded composite article was considered to have passed the test if the bond strength was at least about 3.0 kg/cm. Averages of bond strengths, measured in kg/cm, for tests 24 hours after forming the bond, are set forth in the following table. The table also includes the average bond strength, measured in accordance with the same method, for articles after 5 days at 158° F. (70° C.).

TABLE 1

| S/MA additive | | | Bond Strength, kg/cm | | | | | |
|---|---|---|---|---|---|---|---|---|
| | | | 24 hour Bond Strength | | | Aged Bond Strength | | |
| Type | % | Wash | Avg. | S. Dev. | % Fail | Avg. | S. Dev. | % Fail |
| SMA® 3000 | 4 | MEK | 3.7 | 2.4 | 36 | 4.7 | 1.2 | 7 |
| SMA® 3840 | 2 | Water | 5.2 | 0.7 | 0 | 5.7 | 0.7 | 0 |
| SMA® 3840 | 2 | MEK | 6.6 | 1.4 | 0 | | | |

SMA® 3000 is a copolymer of styrene and maleic anhydride having a molar ratio of styrene to maleic anhydride of about 3:1.

Thus, the data also shows that a blend of Pebax® 7033 with 2 percent SMA® 3840 can be successfully bonded to achieve an average bond strength of at least about 5.2 kg/cm using only water-borne compositions. Articles having this average bond strength may be useful for articles such as shoe soles, for example. The data also shows that the bond strength was improved with aging.

Example 2

Pebax® 7033 PEBA was blended with 2 percent SMA® 3840 styrene/maleic anhydride copolymer to form a blend. Slabs of the blend of PEBA and styrene/maleic anhydride then were bonded to rubber slabs with heating and pressing. Nine bonded slabs were made and each was tested for bond strength after 24 hours of aging, as set forth in Example 1.

The PEBA/styrene/maleic anhydride blend was washed with a water-borne wash comprising oxalic acid in solution. The water-borne wash also was used on the rubber slab.

After washing, the slabs were primed. Nan Pao UE-8SF water-borne primer was combined with between 3 percent and 5 percent CL-16 hardener and applied to the blend of Pebax® 7033 and SMA® 3840. Greco 005AB was used to prime the rubber slabs. All slabs were dried in an oven at a temperature of 55° C. for 200 seconds and then were removed from the oven.

Adhesive then was applied to the surfaces of the dried primed slabs to be bonded. Nan Pao polyurethane adhesive 57 was combined with 3 percent to 5 percent CL-16 hardener and applied to the surfaces to be bonded of all the dried primed slabs. The slabs then were dried and the adhesive was activated in an oven at a temperature of 55° C. for 200 seconds. The slabs then were removed from the oven.

The surface of a slab of the blend of PEBA and styrene/maleic anhydride to which adhesive had been applied then was moved into contact with the surface of a slab of rubber to which adhesive had been applied, dried, and activated, and then were pressed together at a pressure of 30 kg/cm² for between 13 seconds to 15 seconds to form a bonded composite article.

The bonded composite articles then were subjected to testing to determine bond strength. The bonded composite article was considered to have passed the test if the bond strength was at least 3.0 kg/cm. The bond strengths were set forth in the following Table 2.

TABLE 2

| Slab No. | Bond Strength Score, kg/cm | | | | | Average |
|---|---|---|---|---|---|---|
| 1 | 3.5 | 3.8 | 4.0 | 4.2 | 4.0 | 3.9 |
| 2 | 4.9 | 4.2 | 4.4 | 4.1 | 4.6 | 4.4 |
| 3 | 4.5 | 4.7 | 4.4 | 4.3 | 4.6 | 4.5 |

TABLE 2-continued

| Slab No. | Bond Strength Score, kg/cm | | | | | Average |
|---|---|---|---|---|---|---|
| 4 | 4.4 | 4.5 | 5.0 | 5.1 | 4.0 | 4.6 |
| 5 | 4.7 | 4.4 | 4.5 | 4.7 | 4.2 | 4.5 |
| 6 | 4.0 | 4.5 | 4.4 | 5.0 | 4.3 | 4.4 |
| 7 | 3.8 | 3.5 | 3.9 | 4.1 | 4.9 | 4.0 |
| 8 | 4.0 | 3.2 | 3.6 | 4.2 | 4.2 | 3.8 |
| 9 | 4.3 | 4.5 | 4.2 | 4.1 | 4.2 | 4.3 |

Thus, the data shows that a blend of Pebax® 7033 with 2 percent SMA® 3840 was successfully bonded to rubber material using only water-borne compositions and produced bonded composite articles that exceeded a typical bond strength that may be useful for articles such as shoe soles, for example, with no failures. There were no average test values less than 3.8 kg/cm after 24 hours aging.

Example 3

Pebax® 7033 PEBA was blended with 2 percent SMA® 40001 styrene/maleic anhydride copolymer to form a blend. SMA® 40001 is a styrene/maleic anhydride copolymer having a molar ratio of styrene to maleic anhydride of about 4/1.

Slabs of the blend of PEBA and styrene/maleic anhydride then were bonded to rubber slabs with heating and pressing. Nine bonded slabs were made and each was tested for bond strength as set forth in Example 1.

The slabs were processed in accordance with the method of Example 2 to form bonded composite articles. The bonded composite articles then were subjected to testing to determine bond strength. The bonded composite article was considered to have passed the test if the bond strength was at least 3.0 kg/cm. The bond strengths, measured in kg/cm, for five tests on each slab after 24 hours, together with average bond strength, are set forth in the following Table 3:

TABLE 3

| Slab No. | Bond Strength Score, kg/cm | | | | | Average |
|---|---|---|---|---|---|---|
| 1 | 3.2 | 4.2 | 3.6 | 3.4 | 3.3 | 3.5 |
| 2 | 3.0 | 4.1 | 4.3 | 4.6 | 4.1 | 4.0 |
| 3 | 3.0 | 2.8 | 3.1 | 3.7 | 3.0 | 3.1 |
| 4 | 2.7 | 3.3 | 3.2 | 3.0 | 3.1 | 3.1 |
| 5 | 3.1 | 3.6 | 3.8 | 3.8 | 3.2 | 3.5 |
| 6 | 3.3 | 3.5 | 3.3 | 3.2 | 3.3 | 3.3 |
| 7 | 3.5 | 3.3 | 3.4 | 4.3 | 3.7 | 3.6 |
| 8 | 3.0 | 2.6 | 2.2 | 3.4 | 2.9 | 2.8 |
| 9 | 2.6 | 2.8 | 3.1 | 3.2 | 3.1 | 3.0 |

Table 3 illustrates that all samples were successfully bonded, with a minimum average bond strength of 2.8 kg/cm. Eight of 9 sample slabs achieved an average bond strength of at least 3.0 kg/cm.

While various embodiments of the invention have been described, the description is intended to be exemplary, rather than limiting and it will be apparent to those of ordinary skill in the art that many more embodiments and implementations are possible that are within the scope of the invention. For example, proportions of PEBA and styrene/maleic anhydride may differ within the ranges described from those exemplified. Accordingly, the invention is not to be restricted except in light of the attached claims and their equivalents. Also, various modifications and changes may be made within the scope of the attached claims.

What is claimed is:

1. A method for bonding a first substrate comprising a blend of polyether block amide and styrene/maleic anhydride copolymer a second substrate, the method comprising:

cleaning a surface on the first substrate with a first aqueous cleaning solution comprising oxalic acid to form a first clean prepared surface;

applying an aqueous primer to the first clean prepared surface on the first substrate to form a primed surface on the first substrate;

applying a water-borne adhesive to the primed surface on the first substrate to form an adhesive-coated surface on the first substrate;

applying an aqueous primer to a second clean prepared surface on the second substrate to form a primed surface on the second substrate;

applying a water-borne adhesive to the primed surface on the second substrate to form an adhesive-coated surface on the second substrate; and contacting the adhesive-coated surface on the first substrate with the adhesive-coated surface of second substrate to bond the first substrate and the second substrate.

2. The method of claim 1, further comprising cleaning a surface of the second substrate with a second aqueous cleaning solution to form the second clean prepared surface.

3. The method of claim 2, wherein the second aqueous cleaning solution comprises oxalic acid.

4. The method of claim 1, further comprising drying the aqueous primer on the primed surface of the first substrate before applying water-borne adhesive thereto and drying the aqueous primer on the primed surface of the second substrate before applying water-borne adhesive thereto.

5. The method of claim 4, further comprising drying the water-borne adhesive on the adhesive-coated surface of the first substrate and drying the water-borne adhesive on the adhesive-coated surface of the second substrate before contacting the adhesive-coated surface of the first substrate with the adhesive-coated surface of the second substrate to bond the first substrate and the second substrate.

6. The method of claim 5, further comprising activating the water-borne adhesive on the adhesive-coated surface of the first substrate and activating the water-borne adhesive on the adhesive-coated surface of the second substrate before contacting the adhesive-coating surface of the first substrate with the adhesive-coated surface of the second substrate to bond the first substrate and the second substrate.

7. The method of claim 6, further comprising pressing the adhesive-coated surface of the first substrate to the adhesive-coated surface of the second substrate after bringing the adhesive-coated first surface and the adhesive-coated second surface into contact.

8. The method of claim 1, wherein the styrene/maleic anhydride in the blend of polyether block amide and styrene/maleic anhydride copolymer is unmodified.

9. The method of claim 1, wherein the styrene/maleic anhydride in the blend of polyether block amide and styrene/maleic anhydride copolymer is esterified.

10. The method of claim 4, wherein the styrene/maleic anhydride in the blend of polyether block amide and styrene/maleic anhydride copolymer is unmodified.

11. The method of claim 7, wherein the styrene/maleic anhydride in the blend of polyether block amide and styrene/maleic anhydride copolymer is unmodified.

12. The method of claim 4, wherein the styrene/maleic anhydride in the blend of polyether block amide and styrene/maleic anhydride copolymer is esterified.

13. The method of claim 7, wherein the styrene/maleic anhydride in the blend of polyether block amide and styrene/maleic anhydride copolymer is esterified.

* * * * *